(12) United States Patent
Fukuoka et al.

(10) Patent No.: US 7,729,443 B2
(45) Date of Patent: Jun. 1, 2010

(54) WIRELESS COMMUNICATION APPARATUS AND WIRELESS COMMUNICATION METHOD

(75) Inventors: Masaru Fukuoka, Ishikawa (JP); Sadaki Futagi, Ishikawa (JP); Daichi Imamura, Kanagawa (JP); Tomohiro Imai, Kanagawa (JP)

(73) Assignee: Panasonic Corporation, Osaka (JP)

( * ) Notice: Subject to any disclaimer, the term of this patent is extended or adjusted under 35 U.S.C. 154(b) by 546 days.

(21) Appl. No.: 11/722,831

(22) PCT Filed: Dec. 26, 2005

(86) PCT No.: PCT/JP2005/023805

§ 371 (c)(1), (2), (4) Date: Jun. 26, 2007

(87) PCT Pub. No.: WO2006/070754

PCT Pub. Date: Jul. 6, 2006

(65) Prior Publication Data

US 2007/0286310 A1    Dec. 13, 2007

(30) Foreign Application Priority Data

Dec. 28, 2004    (JP)    .............................. 2004-381888

(51) Int. Cl.
*H04L 27/00*    (2006.01)
*H04L 23/00*    (2006.01)
(52) U.S. Cl. ...................................... 375/295; 375/377
(58) Field of Classification Search ................. 375/260, 375/295, 296, 285, 358, 377; 370/210, 208
See application file for complete search history.

(56) References Cited

U.S. PATENT DOCUMENTS

| 2004/0125882 | A1* | 7/2004 | Miyoshi | ...................... 375/260 |
| 2005/0007947 | A1 | 1/2005 | Abe et al. | |
| 2006/0256755 | A1 | 11/2006 | Matsumoto et al. | |
| 2007/0263666 | A1* | 11/2007 | Yoshii et al. | ................. 370/491 |
| 2009/0103648 | A1* | 4/2009 | Fukuoka et al. | ............. 375/267 |

FOREIGN PATENT DOCUMENTS

| JP | 2003 32226 | 1/2003 |
| JP | 2004 32712 | 1/2004 |
| JP | 2004 10475 | 4/2004 |

OTHER PUBLICATIONS

PCT International Search Report dated Feb. 7, 2006.
I. Yoshii, et al.; "Performance Comparison of Repetition OFDM and 2-D MC-CDMA for 4G Cellular Downlink Communication," 9th Int'l OFDM-Workshop 2004, Dresden, pp. 1-5.

* cited by examiner

*Primary Examiner*—Tesfaldet Bocure
(74) *Attorney, Agent, or Firm*—Dickinson Wright PLLC

(57) ABSTRACT

A wireless communication method of repetition system and the like for ensuring that when the same data symbols are combined, a diversity gain is achieved. In a step (ST 420), a data symbol placing part (105) decides destination places of respective replicated data symbols ($S_1$-$S_4$) such that the same data symbols are not placed at destination place numbers (7,8) of data symbols that exhibit poor channel estimation precisions. In a step (ST 430), the data symbol placing part (105) places, in accordance with the decision in the foregoing step (ST 420), the four data symbols ($S_1$-$S_4$), which are received from a repetition part (102), in one frame received from a channel estimation error predicting part (104).

7 Claims, 21 Drawing Sheets

WIRELESS COMMUNICATION APPARATUS AND WIRELESS COMMUNICATION METHOD

TECHNICAL FIELD

The present invention relates to a Repetition type radio communication method and apparatus for transmitting a plurality of duplicated data symbols. The present invention can be applied to, for example, a Repetition-OFDM (Orthogonal Frequency Division Multiplexing) scheme.

BACKGROUND ART

Conventionally, a Repetition type radio communication method has been known where a transmitting-side radio communication apparatus transmits a radio signal including a plurality of same data symbols, and a receiving-side radio communication apparatus combines symbols of the same data symbols included in the received radio signal and obtains diversity gain. For example, for next-generation mobile communication, a Repetition-OFDM scheme has been proposed where a transmitting-side radio communication apparatus repeatedly arranges the same data symbols in the time domain and the frequency domain in an OFDM signal randomly and discretely (for example, see Non-patent Document 1). Non-patent Document 1: "Performance Comparison of Repetition OFDM and 2-D MC-CDMA for 4G Cellular Downlink Communication" 9th International OFDM-Workshop, Dresden, Germany, September. 2004

DISCLOSURE OF INVENTION

Problems to be Solved by the Invention

However, in a conventional method of arranging data symbols, arrangement of data symbols is basically random, and therefore there are cases where the same data symbols are collectively arranged in arranged locations where channel estimation errors are large, and there is a problem that circumstances arise where adequate diversity gain cannot be obtained through symbol combining.

Herein, FIG. 1 shows an example of a typical aspect of channel estimation errors occurring in arranged locations of data symbols when a channel estimation value estimated based on the amplitude and phase of a received pilot symbol is used as a channel estimation value for arranged locations of eight successive data symbols subsequent to the pilot symbol in a receiving-side radio communication apparatus. In the example as shown in FIG. 1, the channel estimation error increases as the distance in the time domain from a pilot symbol increases. Further, in the example as shown in FIG. 1, two-times Repetition of repeatedly arranging four types of data symbols $S_1$ to $S_4$ twice is performed, and data symbols are arranged in the order of $[S_4,S_3,S_2,S_4,S_2,S_3,S_1,S_1]$ in the direction of a lapse of time immediately after the pilot symbol is received.

FIG. 2 illustrates amount of channel estimation errors on the data symbols when the same data symbols are subjected to symbol combining in the example shown in FIG. 1. As can be seen from FIG. 2, the channel estimation accuracy of data symbol $S_1$ is extremely lower than channel estimation accuracy of $S_2$ to $S_4$. Accordingly, in the example shown in FIG. 1, data symbol $S_1$ is collectively allocated in the symbol where the channel estimation accuracy deteriorates, and therefore the combining symbol between data symbol $S_1$ cannot achieve time diversity gain.

It is therefore an object of the present invention to provide a radio communication method and a radio communication apparatus achieving reliably diversity gain when the same data symbols are subjected to symbol combining in a Repetition type radio communication method.

Means for Solving the Problem

A radio communication apparatus according to the invention adopts a configuration provided with: a repetition section that repeats a data symbol and generates a plurality of same data symbols; an error predicting section that predicts channel estimation accuracy in allocated locations of the generated same data symbols; and a data symbol mapping section that maps the same data symbols in the allocated locations where amount of the predicted channel estimation error is a predefined threshold or less.

ADVANTAGEOUS EFFECT OF THE INVENTION

According to the present invention, a transmitting-side radio communication apparatus predicts channel estimation accuracy of symbols allocated data symbols in advance based on an arrangement aspect of a pilot symbol and a channel estimation scheme using the pilot symbol when determining the arranged locations of the data symbols in a Repetition type radio communication method, determines the arranged locations of duplicated data symbols based on the predication results, and therefore it is possible to reliably allocate the data symbols in arranged locations with good channel estimation accuracy, so that the receiving-side radio communication apparatus can achieve time diversity gain with high probability by combining symbols of the repetition symbols.

Further, according to the present invention, the transmitting-side radio communication apparatus determines the arranged locations of the repetition symbols based on the prediction results of the channel estimation errors, so that it is possible to avoid the same data symbols being collectively arranged in arranged locations of data symbols with large channel estimation error, that is, with poor channel estimation accuracy. As a result, according to the present invention, after the receiving-side radio communication apparatus combines symbols of the repeated same data symbols, the receiving-side radio communication apparatus can avoid extreme increase of the channel estimation error of one data symbol, and reliably can achieve diversity gain by symbol combining in all the data symbols included in a radio signal.

BEST MODE FOR CARRYING OUT THE INVENTION

Embodiments of the invention will be described in detail below with reference to the accompanying figures.

Embodiment 1

Figure 1:
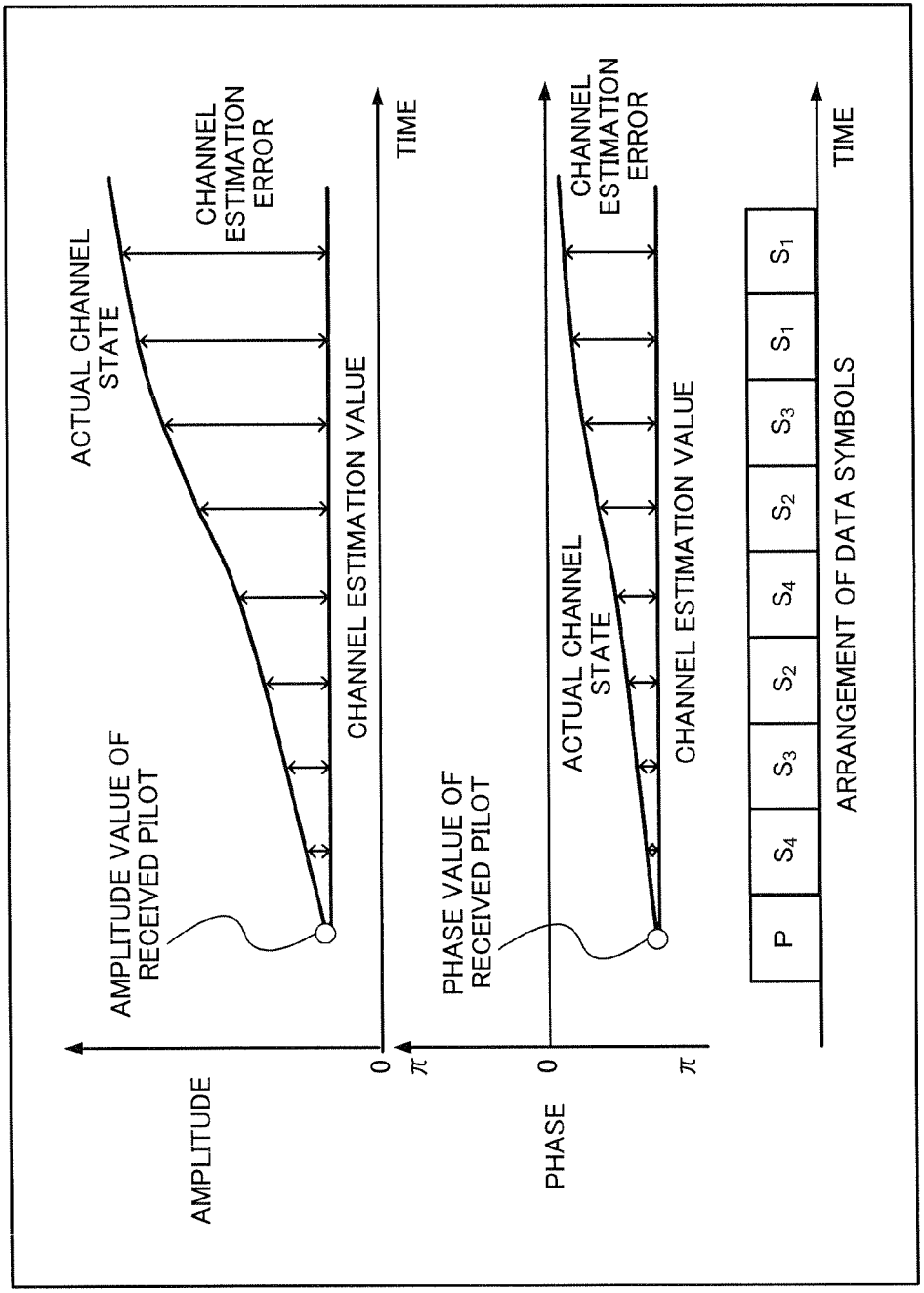
FIG. 1 shows examples of allocation of data symbols in a conventional Repetition type.
Figure 2:
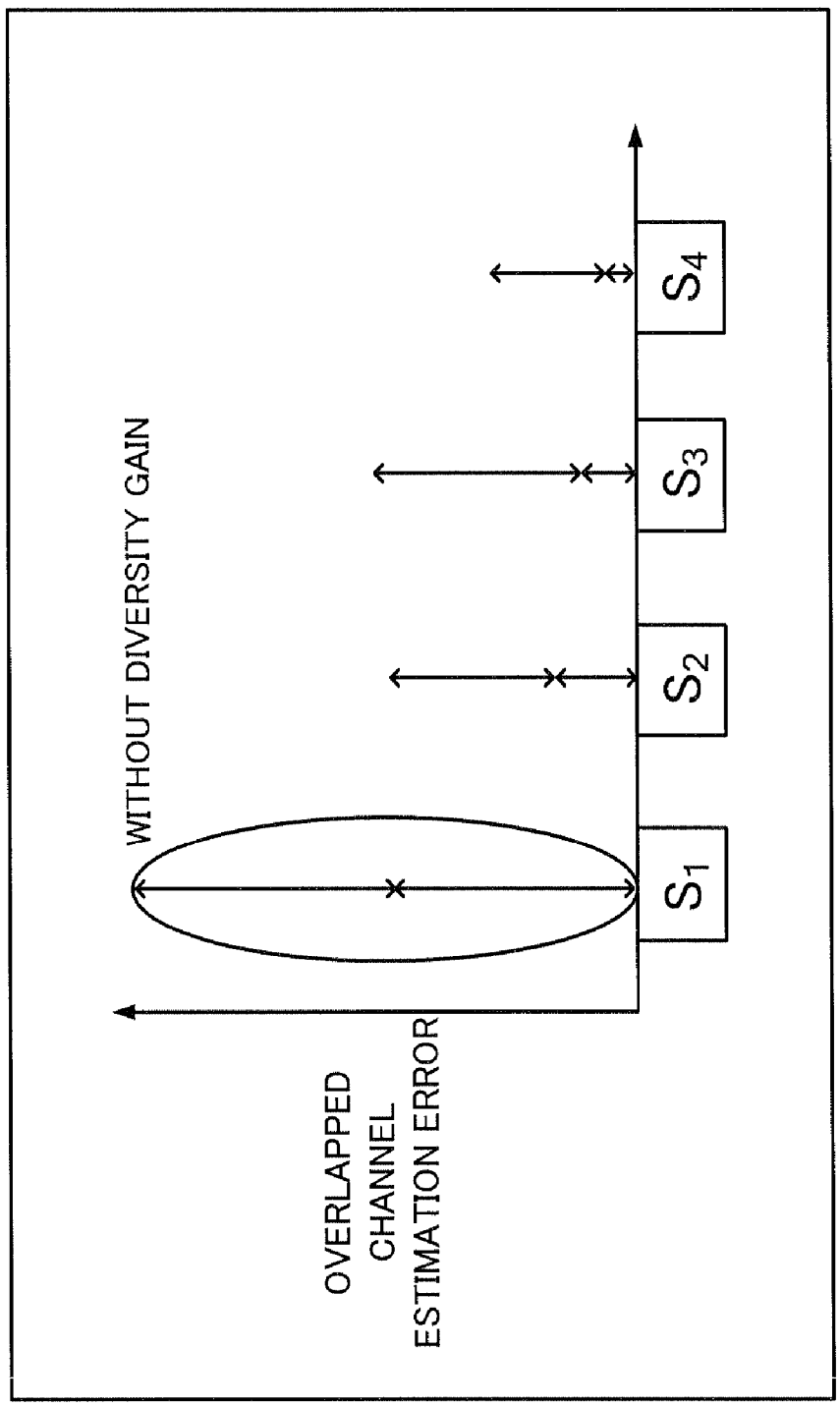
FIG. 2 shows a problem arising from symbol combining in the conventional Repetition type.
Figure 3:
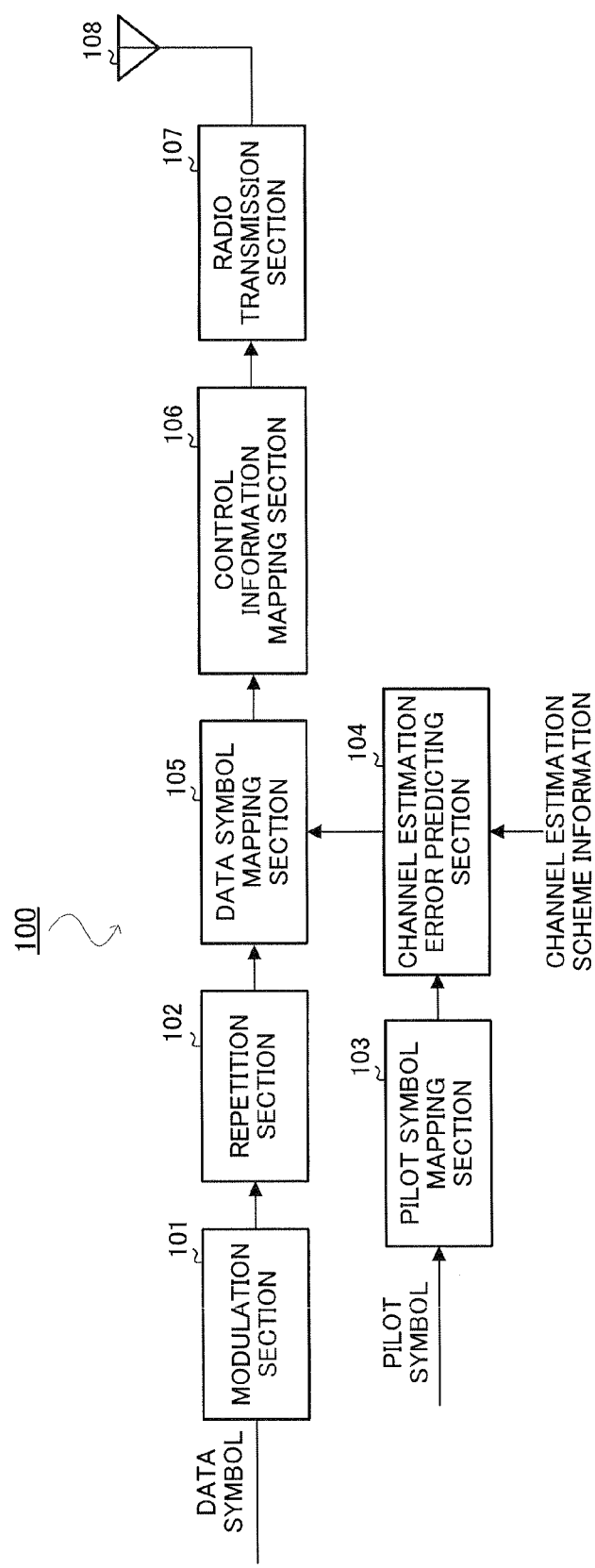
FIG. 3 is a block diagram showing a configuration of the main part of a transmitting-side radio communication apparatus according to Embodiment 1 of the present invention.
Figure 4:
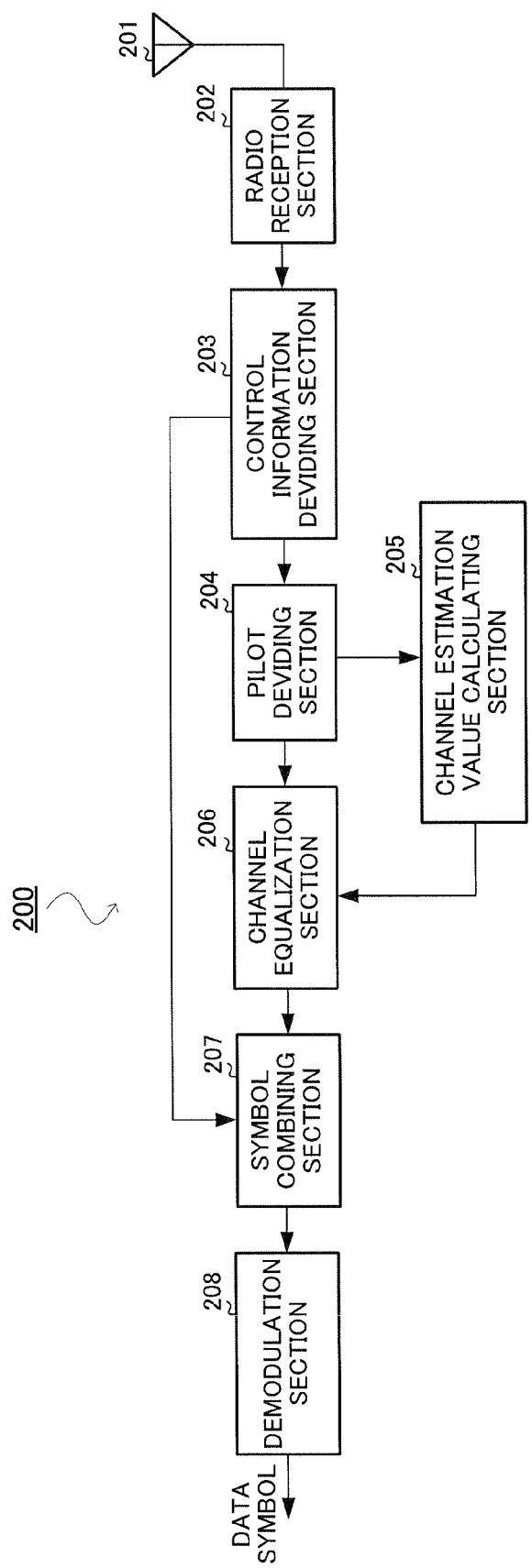
FIG. 4 is a block diagram showing a configuration of the main part of a receiving-side radio communication apparatus according to Embodiment 1 of the present invention.

FIG. 3 is a block diagram showing a configuration of the main part of radio communication apparatus 100 according to Embodiment 1 of the present invention. FIG. 4 is a block diagram showing a configuration of the main part of radio communication apparatus 200 that performs Repetition type radio communication with radio communication apparatus 100.

Radio communication apparatus 100 is a transmitting-side radio communication apparatus, and performs two-times repetition because the same duplicated data symbol twice repeatedly transmits. Meanwhile, radio communication apparatus 200 receives a radio signal transmitted from radio communication apparatus 100, combines symbols of the same data symbols included in the received signal, and thereby achieves diversity gain.

Figure 5:
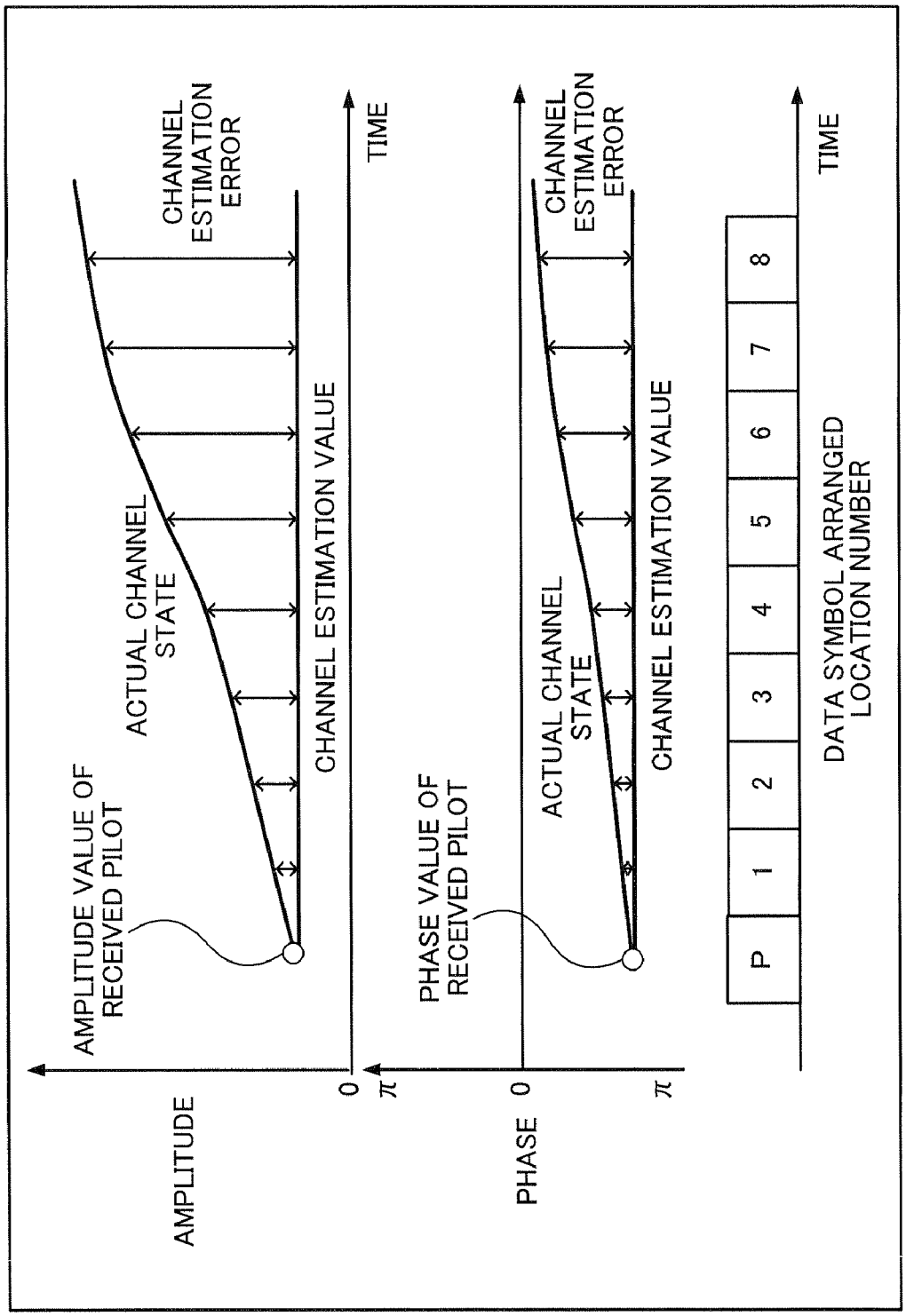
FIG. 5 shows a frame format and the like of a transmission signal in Embodiment 1 of the present invention.

In this embodiment, as shown in FIG. 5, a frame of the radio signal transmitted from radio communication apparatus 100 is comprised of total nine symbols consisting of one pilot symbol and eight successive data symbols subsequent to the pilot symbol. Further, as shown in FIG. 5, data symbol allocated location numbers 1 to 8 are respectively assigned to allocate locations of the eight data symbols subsequent to the pilot symbol in ascending order of a lapse of time from the pilot symbol. In addition, in FIG. 5, "p" enclosed by square indicates the pilot symbol.

Further, it is assumed in this Embodiment that radio communication apparatus 100 allocates four data symbols $S_1$ to $S_4$ twice in a frame, and radio communication apparatus 200 estimates channel estimation values for data symbol allocated location numbers 1 to 8 based on the amplitude and phase of the pilot symbol mapped at the head of the frame.

Radio communication apparatus 100 has modulation section 101, repetition section 102, pilot symbol mapping section 103, channel estimation error predicting section 104, data symbol mapping section 105, control information mapping section 106, radio transmission section 107 and antenna element 108.

Modulation section 101 modulates four data symbols $S_1$ to $S_4$ inputted from a data generating section (not shown) using a modulation scheme such as QPSK (Quadrature Phase Shift Keying) and 16QAM (Quadrature Amplitude Modulation), and inputs the modulated data symbols to repetition section 102.

Repetition section 102 repeats each of four data symbols $S_1$ to $S_4$ inputted from modulation section 101 and obtains two of four data symbols $S_1$ to $S_4$, that is, total eight symbols. Then, repetition section 102 inputs eight repeated data symbols to data symbol mapping section 105.

Pilot symbol mapping section 103 maps a pilot symbol inputted from a pilot generating section (not shown) to a head of a frame, and inputs the frame to channel estimation error predicting section 104.

Based on information of a channel estimation scheme in radio communication apparatus 200 reported from a control section (not shown), channel estimation error predicting section 104 predicts channel estimation errors for allocated locations of data symbols in the frame in which the pilot symbol is mapped to the head inputted from pilot symbol mapping section 103.

In this Embodiment, based on the amplitude and phase of the pilot symbol mapped to the head of the frame, channel estimation values are estimated for allocated locations of eight subsequent data symbols. Therefore, the amount of the channel estimation errors in allocated location numbers 1 to 8 of the data symbols increase, as the distance increases in the time domain from the pilot symbol. In other words, in this Embodiment, the amount of the channel estimation errors in allocated locations of the data symbols in a frame are as shown in FIG. 5.

Then, channel estimation error predicting section 104 inputs the frame inputted from pilot symbol mapping section 103 and prediction results of the channel estimation errors in the allocated locations of the data symbols to data symbol mapping section 105.

Based on the prediction results of the channel estimation errors in the allocated locations of the data symbols inputted from channel estimation error predicting section 104, data symbol mapping section 105 specifies the allocated location of a data symbol where the level of the channel estimation error exceeds a predefined threshold, and determines that the specified data symbol allocated location is a portion with poor channel estimation accuracy. In this Embodiment, data symbol allocated location numbers 7 and 8 with long distances in the time domain from the pilot symbol are determined as portions with poor channel estimation accuracy.

Then, data symbol mapping section 105 maps eight data symbols so that the same repeated data symbols are not mapped in data symbol allocated location numbers 7 and 8 determined as portions with poor channel estimation accuracy, when mapping eight data symbols inputted from repetition section 102 in the data symbol allocated locations in the frame inputted from channel estimation error predicting section 104.

In addition, in this Embodiment, data symbol mapping section 105 is assumed to arrange data symbols randomly in portions except data symbol arranged location numbers 7 and 8 determined as portions with poor channel estimation accuracy, that is, in data symbol arranged location numbers 1 to 6.

Data symbol mapping section 105 inputs the frame in which eight data symbols are arranged and information (hereinafter, the information is referred to as "control information") indicating where four data symbols $S_1$ to $S_4$ are mapped in data symbol allocated locations in the frame to control information mapping section 106.

Control information mapping section 106 adds the control information inputted from data symbol mapping section 105 to a portion except the frame inputted from data symbol mapping section 105, for example, to a portion immediately after the frame, and inputs the frame to which the control information is added, to radio transmission section 107.

Radio transmission section 107 has a band-pass filter, low-noise amplifier and the like, performs predetermined radio transmission processing such as frequency conversion on the frame inputted from control information mapping section 106, generates a transmission signal, and transmits the generated radio transmission signal to radio communication apparatus 200 via antenna element 108.

On the other hand, radio communication apparatus 200 has antenna element 201, radio reception section 202, control information dividing section 203, pilot dividing section 204, channel estimation value calculating section 205, channel equalization section 206, symbol combining section 207 and demodulation section 208.

Radio reception section 202 has a frequency converter, low noise amplifier and the like, receives the radio signal from radio communication apparatus 100 via antenna element 201, performs predetermined radio reception processing on the received signal, and outputs the received signal subjected to the radio reception processing to control information dividing section 203.

Control information dividing section 203 divides the received signal inputted from radio reception section 202 into the control information and the frame included in the received signal, and outputs the divided control information to symbol combining section 207, and the divided frame to symbol dividing section 204.

Symbol dividing section 204 divides the frame inputted from control information dividing section 203 into the pilot symbol allocated at the head and successive eight data symbols subsequent to the pilot symbol, and outputs the divided pilot symbol to channel estimation value calculating section 205, and the eight divided data symbols to channel equalization section 206.

Channel estimation value calculating section 205 measures the amplitude and phase of the pilot symbol inputted from symbol dividing section 204, and based on the measurement values, calculates a channel estimation value applied to the frame in which the pilot symbol is included using a predetermined means. Channel estimation value calculating section 205 inputs the calculated channel estimation value to channel equalization section 206.

Based on the channel estimation value inputted from channel estimation value calculating section 205, channel equalization section 206 calculates amounts of equalizing for the amplitude and phase of each of eight data symbols using a predetermined means, and according to the calculation results, compensates for the data symbols inputted from symbol dividing section 204. Then, channel equalization section 206 inputs eight data symbols whose amplitude and phase are compensated for to symbol combining section 207.

Based on the control information inputted from control information dividing section 203, symbol combining section 207 performs symbol combining on the same data symbols among eight data symbols inputted from channel equalization section 106, and inputs four types of symbol-combined data symbols $S_1$ to $S_4$ to demodulation section 208.

Demodulation section 208 demodulates four data symbols $S_1$ to $S_4$ inputted from symbol combining section 207 with a demodulation scheme corresponding to the modulation scheme such as QPSK and 16QAM, and inputs demodulated data symbols to a control section and the like (not shown).

Figure 6:
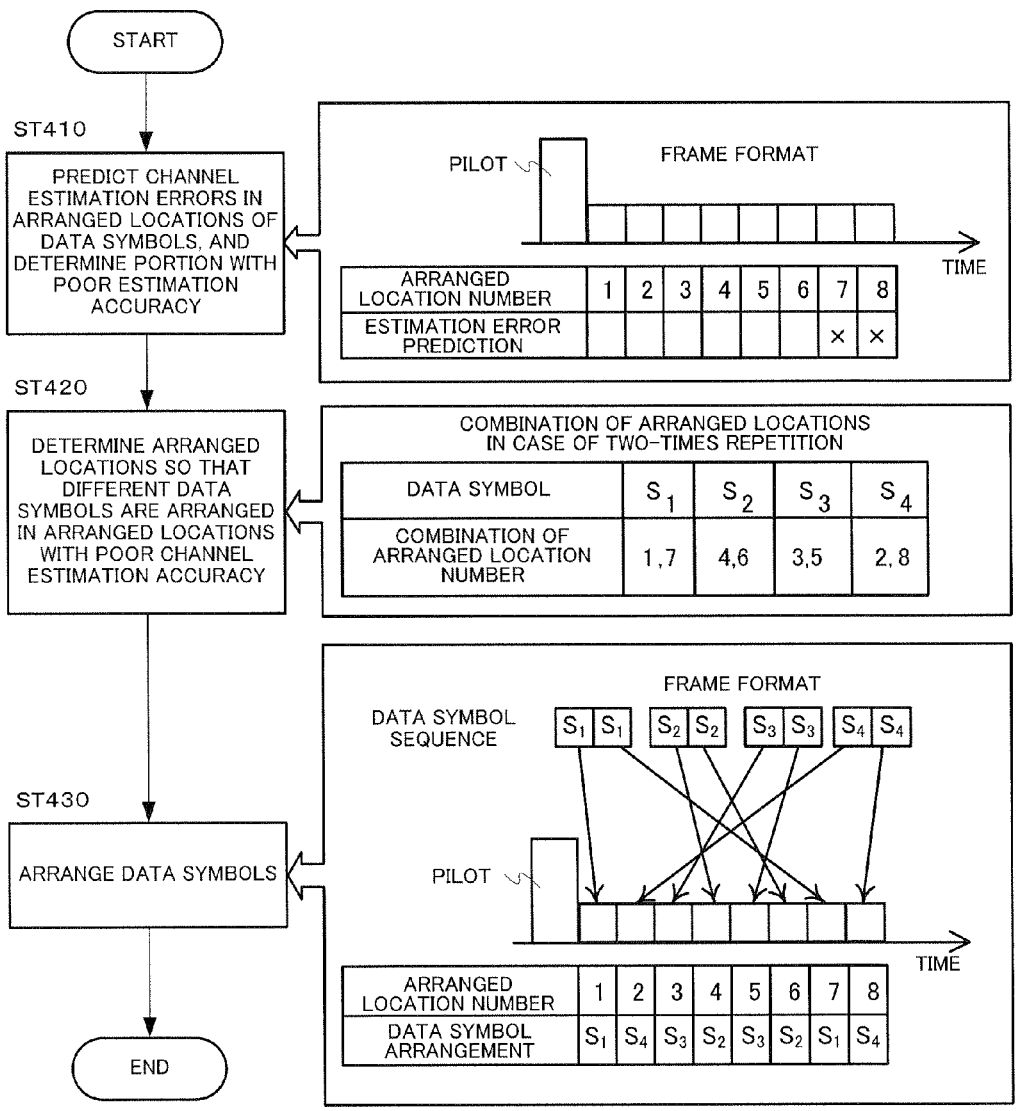
FIG. 6 shows the flow of a radio communication method according to Embodiment 1 of the present invention.
Figure 7:
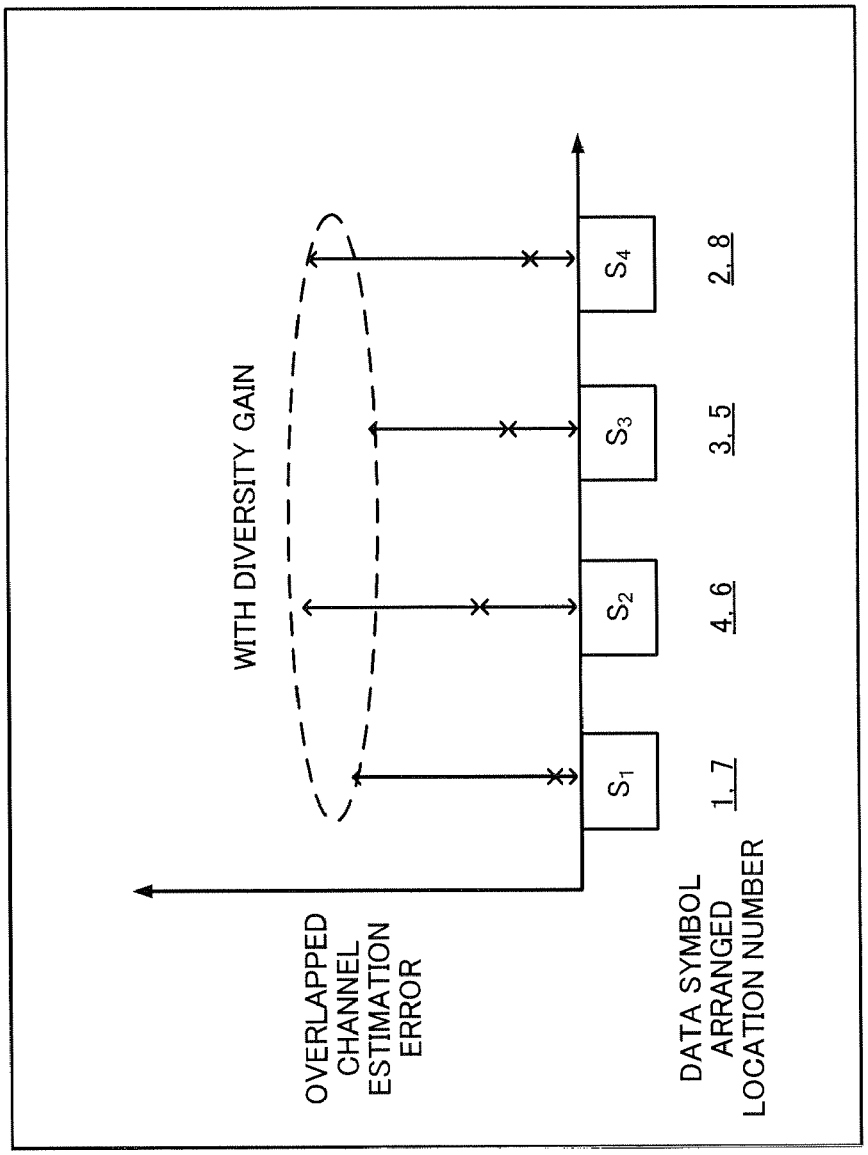
FIG. 7 illustrates the effect achieved by symbol combining in Embodiment 1 of the present invention.

Referring to FIGS. 6 and 7, the operation of radio communication apparatus 100 in this Embodiment—the radio communication method according to the present invention—will be described.

FIG. 6 schematically shows each step in arranging four data symbols $S_1$ to $S_4$ in arranged locations of data symbols in a frame.

First, in step ST410, channel estimation error predicting section 104 predicts channel estimation errors in the data symbol allocated locations in a frame, and based on the prediction results, data symbol mapping section 105 determines that data symbol arranged location numbers 7 and 8 are portions with poor channel estimation accuracy.

Next, in step ST420, data symbol mapping section 105 determines arranged locations for duplicated data symbols $S_1$ to $S_4$ so that same data symbols are not arranged in data symbol arranged location numbers 7 and 8 with poor channel estimation accuracy. In this Embodiment, as shown in FIG. 6, data symbol mapping section 105 determines to arrange two data symbols $S_1$ in data symbol arranged location numbers 1 and 7, two data symbols $S_2$ in data symbol arranged location numbers 4 and 6, two data symbols $S_3$ in data symbol arranged location numbers 3 and 5, and two data symbols $S_4$ in data symbol arranged location numbers 2 and 8.

Subsequently, in step ST430, data symbol mapping section 105 arranges four data symbols $S_1$ to $S_4$ inputted from repetition section 102 in the frame inputted from channel estimation error predicting section 104 according to the determination in step ST420. Accordingly, in this Embodiment, as shown in FIG. 6, the data symbols are mapped in the frame in the order of $[S_1, S_4, S_3, S_2, S_3, S_2, S_1, S_4]$ in the direction of a lapse of time from the pilot symbol.

FIG. 7 shows amount of channel estimation errors overlapped through symbol combining for data symbols $S_1$ to $S_4$ when the channel estimation errors predicted by channel estimation error predicting section 104 in the data symbol allocated locations are as shown in FIG. 5, and the arranged locations of data symbols $S_1$ to $S_4$ determined by data symbol mapping section 105 are as shown in FIG. 6.

As can be seen from FIG. 7, according to this Embodiment, different data symbols $S_1$ and $S_4$ are mapped in data symbol arranged location numbers 7 and 8 predicted as having large channel estimation errors, and therefore any extremely large level does not arise in overlapped channel estimation errors of data symbols $S_1$ to $S_4$, so that it is possible to reliably obtain diversity gain through symbol combining in all the data symbols $S_1$ to $S_4$.

In addition, this Embodiment may be applied or modified as described below.

This Embodiment has described the case where based on the prediction results of the channel estimation errors in the data symbol allocated locations inputted from channel estimation error predicting section 104, data symbol mapping section 105 specifies a data symbol arranged location where the predicted level of the channel estimation error exceeds a predetermined threshold, determines that the specified data symbol arranged location is a portion with poor channel estimation accuracy, and arranges different data symbols in the arranged locations with poor channel estimation accuracy, but the present invention is not limited to this case. For example, data symbol mapping section 105 specifies an arranged location with good channel estimation accuracy where the channel estimation accuracy is less than or equal to a predetermined threshold, and preferentially arranges an important data symbol in the specified arranged location. By this means, for the data symbol arranged in the arranged location with good channel estimation accuracy, radio communication apparatus 200 is capable of reliably obtaining diversity gain through symbol combining.

This Embodiment has described the case where a single frame is comprised of nine symbols consisting of one pilot symbol and eight successive data symbols subsequent to the pilot symbol, and for arranged locations of the eight successive data symbols, the channel estimation values are calculated based on the amplitude and phase of the pilot symbol allocated at the head of the frame, but the present invention is not limited to this case. For example, a frame may be comprised of ten symbols consisting of two pilot symbols and eight data symbols putted between the pilot symbols, so that channel estimation values for arranged locations of the eight data symbols are calculated based on the amplitude and phase of the pilot symbol allocated at the head of the frame and the amplitude and phase of the pilot symbol allocated at the end of the frame. Thus, when channel estimation is performed for the arranged locations of data symbols between pilot symbols based on the amplitudes and phases of a plurality of pilot symbols, it is possible to improve the channel estimation accuracy over the entire channel estimation interval.

Figure 8:
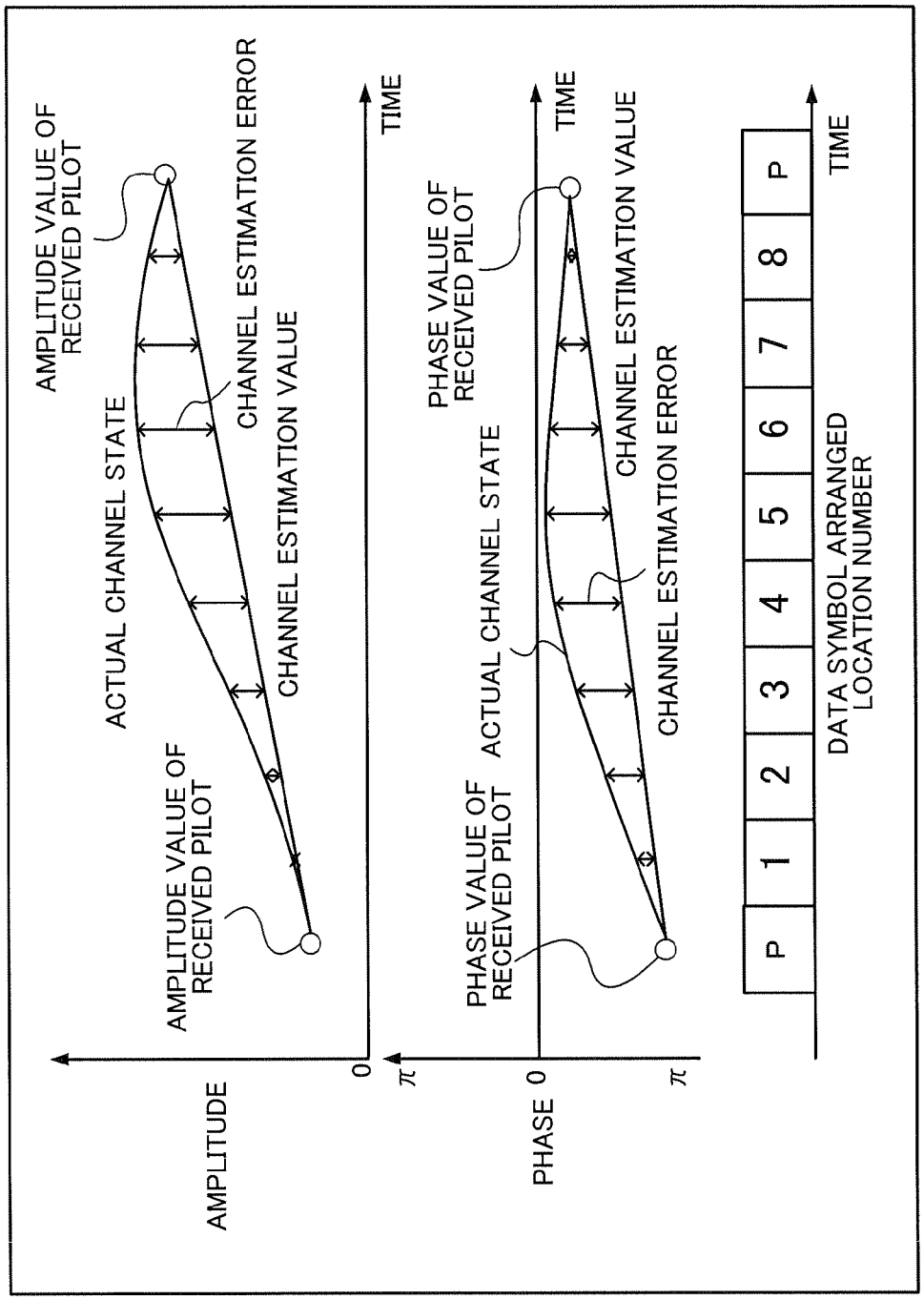
FIG. 8 shows a transmission frame format and the like of a transmission signal in a modification example of Embodiment 1 of the present invention.
Figure 9:
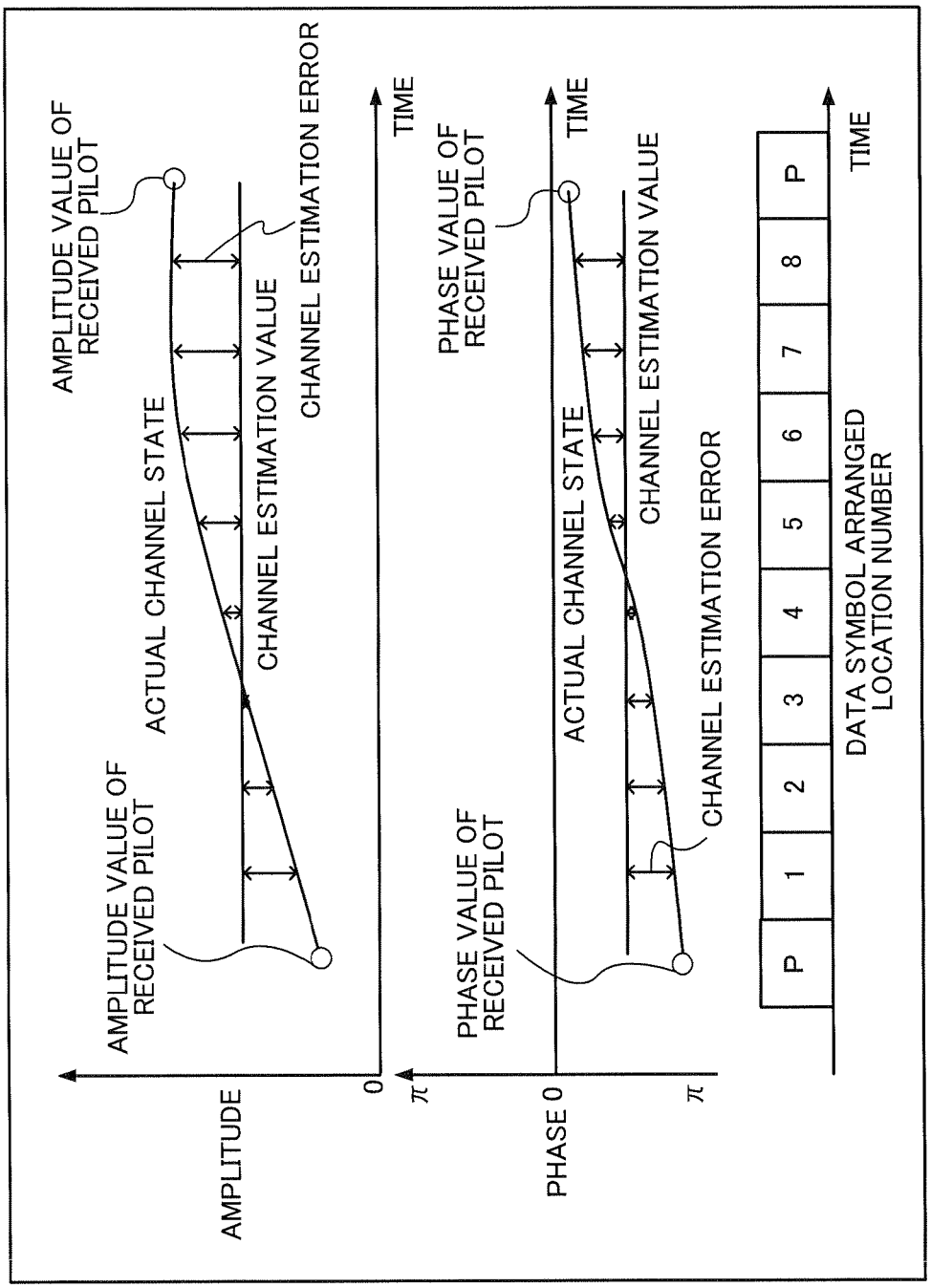
FIG. 9 shows a transmission frame format in another modification example of Embodiment 1 of the present invention.

Herein, when pilot symbols are arranged at the head and the end of a frame, as a channel estimation scheme for arranged locations of data symbols existing between the pilot symbols, for example, there are a first-order interpolation scheme as shown in FIG. 8 and a zero-order interpolation scheme as shown in FIG. 9.

In the first-order interpolation scheme, when a portion between adjacent two pilot symbols is set as a single channel estimation interval, it is assumed that differences in amplitude and phase between two pilot symbols at ends of the channel estimation interval change linearly in the channel estimation interval. Therefore, in the first-order interpolation scheme, as shown in FIG. 8, the channel estimation error decreases at both ends of the channel estimation interval, and increases at the center of the channel estimation interval.

Further, in the zero-order interpolation scheme, it is assumed that average values of the amplitudes and phases of two pilot symbols at ends of the channel estimation interval are channel estimation values in the channel estimation interval, and therefore, as shown in FIG. 9, the channel estimation error increases at both ends of the channel estimation interval, and decreases at the center of the channel estimation interval.

Figure 10:
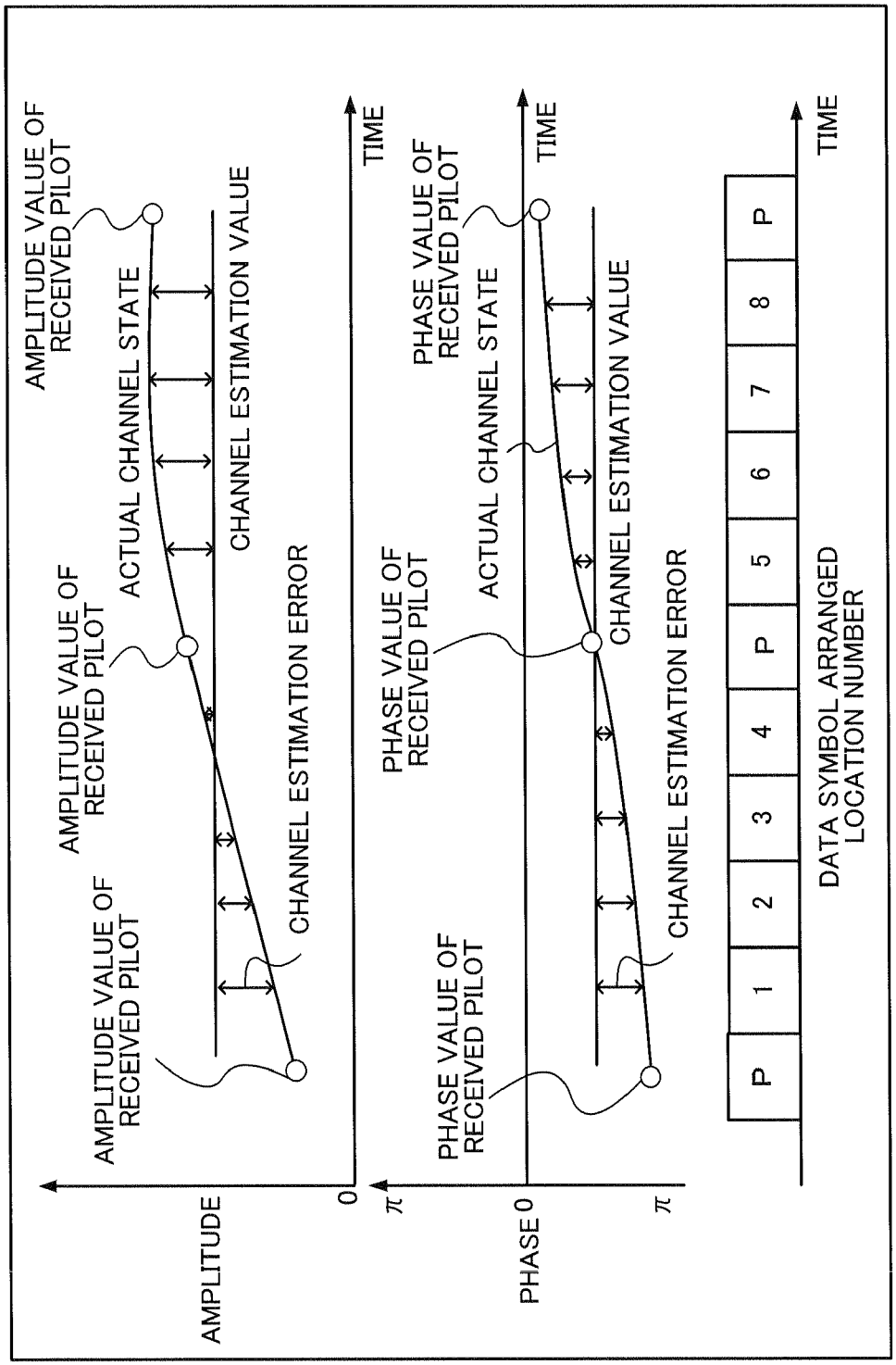
FIG. 10 shows a transmission frame format in another modification example of Embodiment 1 of the present invention.

Furthermore, when pilot symbols are arranged at the head, center and end of a frame, as a channel estimation scheme for arranged locations of data symbols existing between the pilot symbols, for example, there is a zero-order interpolation scheme as shown in FIG. 10. Also in this case, the channel estimation error increases at both ends of the channel estimation interval, and decreases at the center of the channel estimation interval.

Figure 11:
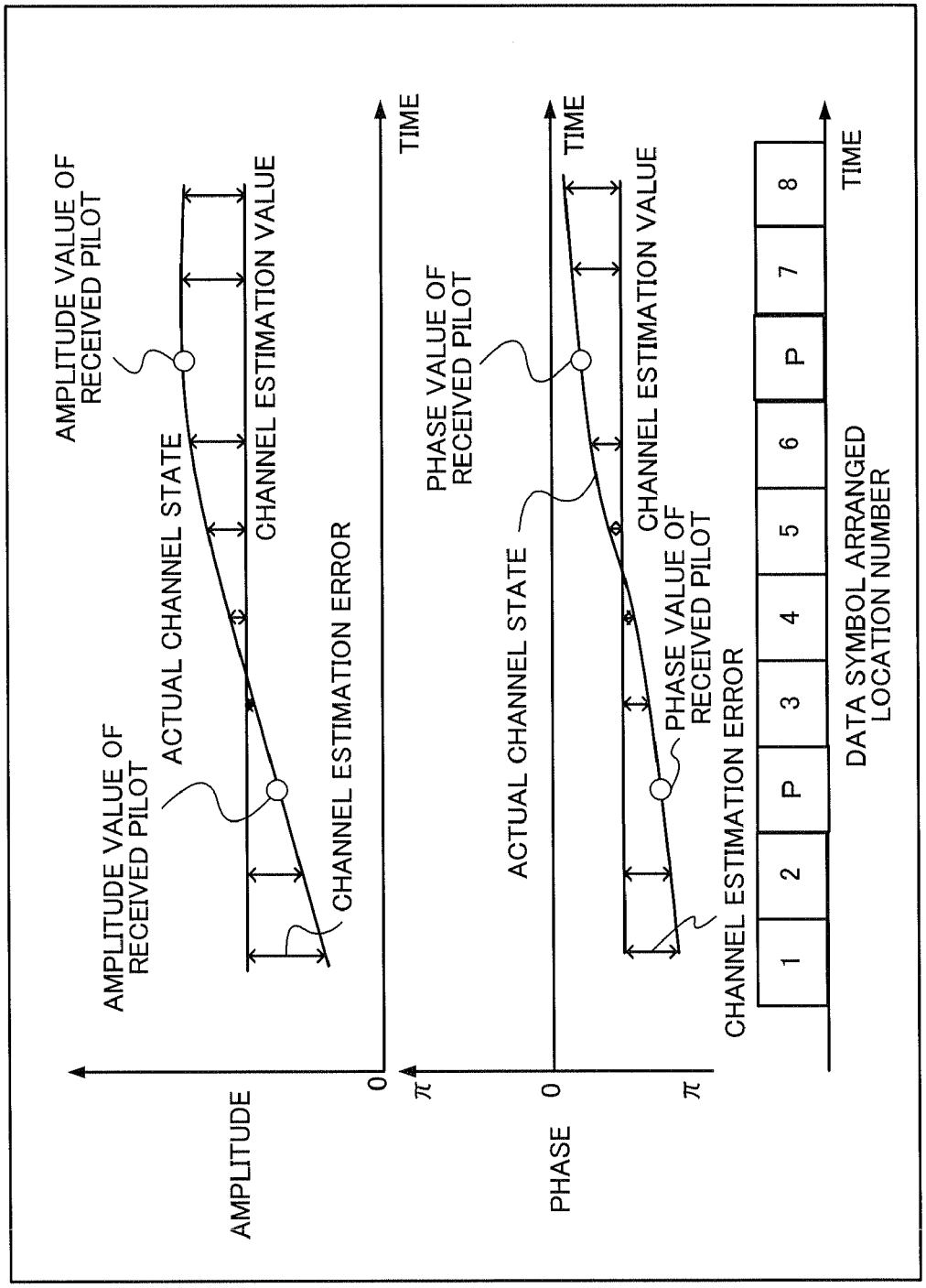
FIG. 11 shows a transmission frame format in another modification example of Embodiment 1 of the present invention.

Still furthermore, when a plurality of pilot symbols are not arranged at both ends of a channel estimation interval, for example, when each of two pilot symbols is put between data symbols as shown in FIG. 11, as a channel estimation scheme for arranged locations of data symbols in the frame, the zero-order interpolation scheme can be applied. Also in this case, the channel estimation error increases at both ends of the channel estimation interval, and decreases at the center of the channel estimation interval.

Accordingly, when a plurality of pilot symbols are mapped in a single channel estimation interval, the channel estimation error is the maximum in either the ends or the center in the channel estimation interval, and therefore different data symbols are mapped in such portions where the channel estimation error is large, that is, the channel estimation accuracy is poor, and the same data symbols are mapped in one of the arranged locations of data symbols a predetermined number from the end in the channel estimation interval, and in one of the arranged locations a predetermined number from the center in the channel estimation interval. By this means, when the same data symbols are subjected to symbol combining, as in this Embodiment, any extremely high level does not arise in overlapped channel estimation errors, so that it is possible to reliably obtain diversity gain for all the data symbols included in a radio signal.

Figure 12:
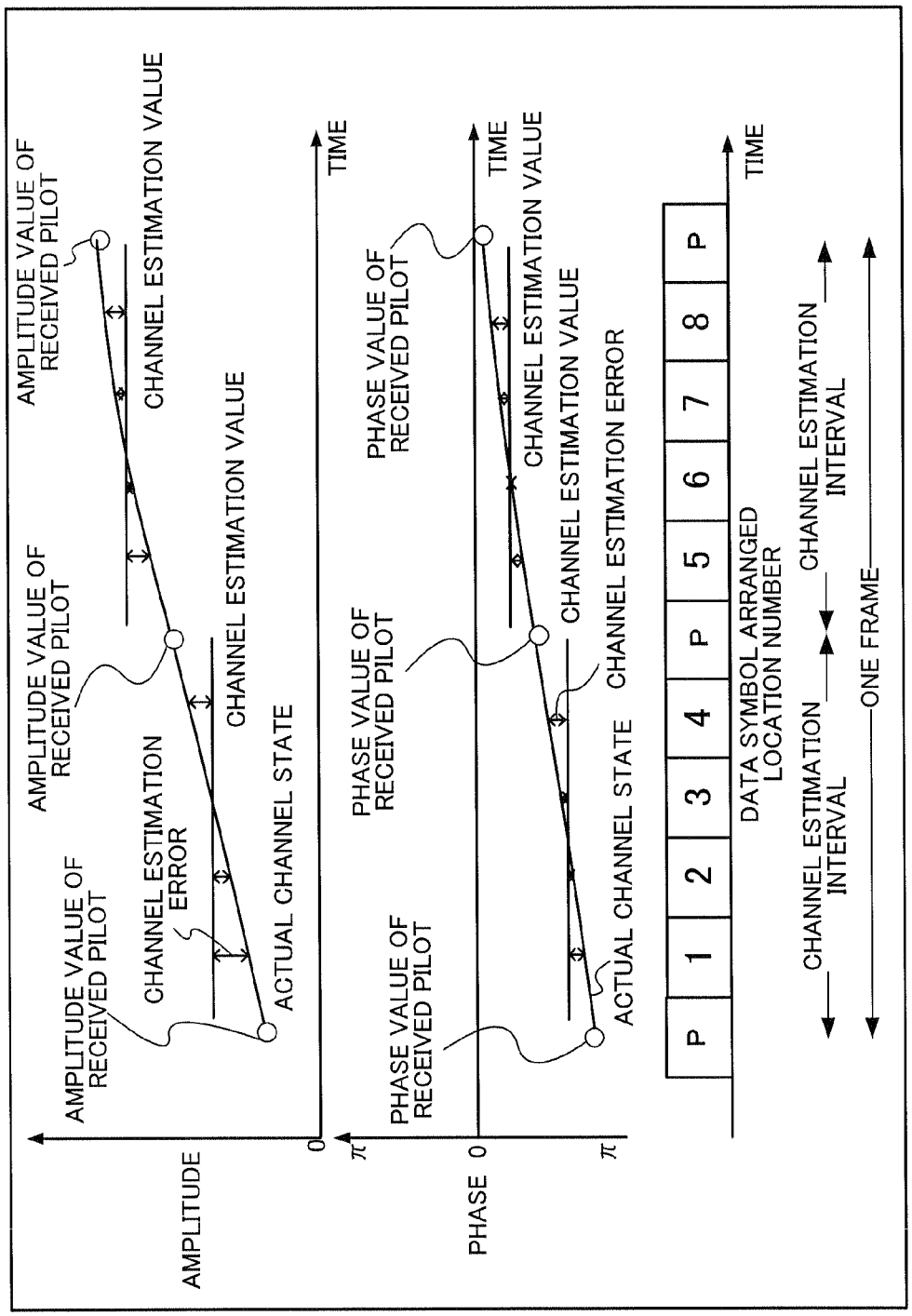
FIG. 12 shows a transmission frame format in still another modification example of Embodiment 1 of the present invention.

Further, this Embodiment has described the case where a single frame is the same as a channel estimation interval, but the present invention is not limited to this case. For example, as shown in FIG. 12, when a plurality of pilot symbols are mapped in a single frame, an interval between adjacent pilot symbols may be set as a single channel estimation interval. By this means, it is possible to decrease the channel estimation errors for the arranged locations of data symbols in a single frame, and therefore the obtained diversity gain further increases when the same data symbols are subjected to symbol combining. In addition, when a plurality of channel estimation intervals are set in a single frame, the same data symbols may be arranged over the channel estimation intervals as shown in FIG. 12.

Furthermore, this Embodiment describes the case where a single frame is the same as a channel estimation interval, but the present invention is not limited to this case. For example, a single channel estimation interval may be set on a plurality of frames.

Moreover, this Embodiment has described the case where based on the levels of the channel estimation errors in the arranged locations of data symbols, data symbol mapping section 105 specifies a data symbol arranged location with poor channel estimation accuracy, but the present invention is not limited to this case. For example, data symbol mapping section 105 may classify degrees of channel estimation accuracy of data symbol allocated locations into several stages based on the levels of the channel estimation errors, and arrange data symbols $S_1$ to $S_4$ according to the classification. By this means, data symbol mapping section 105 can finely control a combination of allocated locations of same data symbols according to the classification of channel estimation accuracy of the allocated locations, and therefore the diversity gain achieved by performing symbol combining on the same data symbols further increases in radio communication apparatus 200.

Further, this Embodiment has described the case where based on the levels of the channel estimation errors, data symbol mapping section 105 specifies a portion with poor channel estimation accuracy in a single frame, but the present invention is not limited to this case. For example, data symbol mapping section 105 may rank data symbol allocated locations using the degree of channel estimation accuracy as a reference, and with reference to the rank, determine arranged locations of data symbols $S_1$ to $S_4$ so that levels of overlapped channel estimation errors are uniformed when the same data symbols are subjected to symbol combining.

Figure 13:
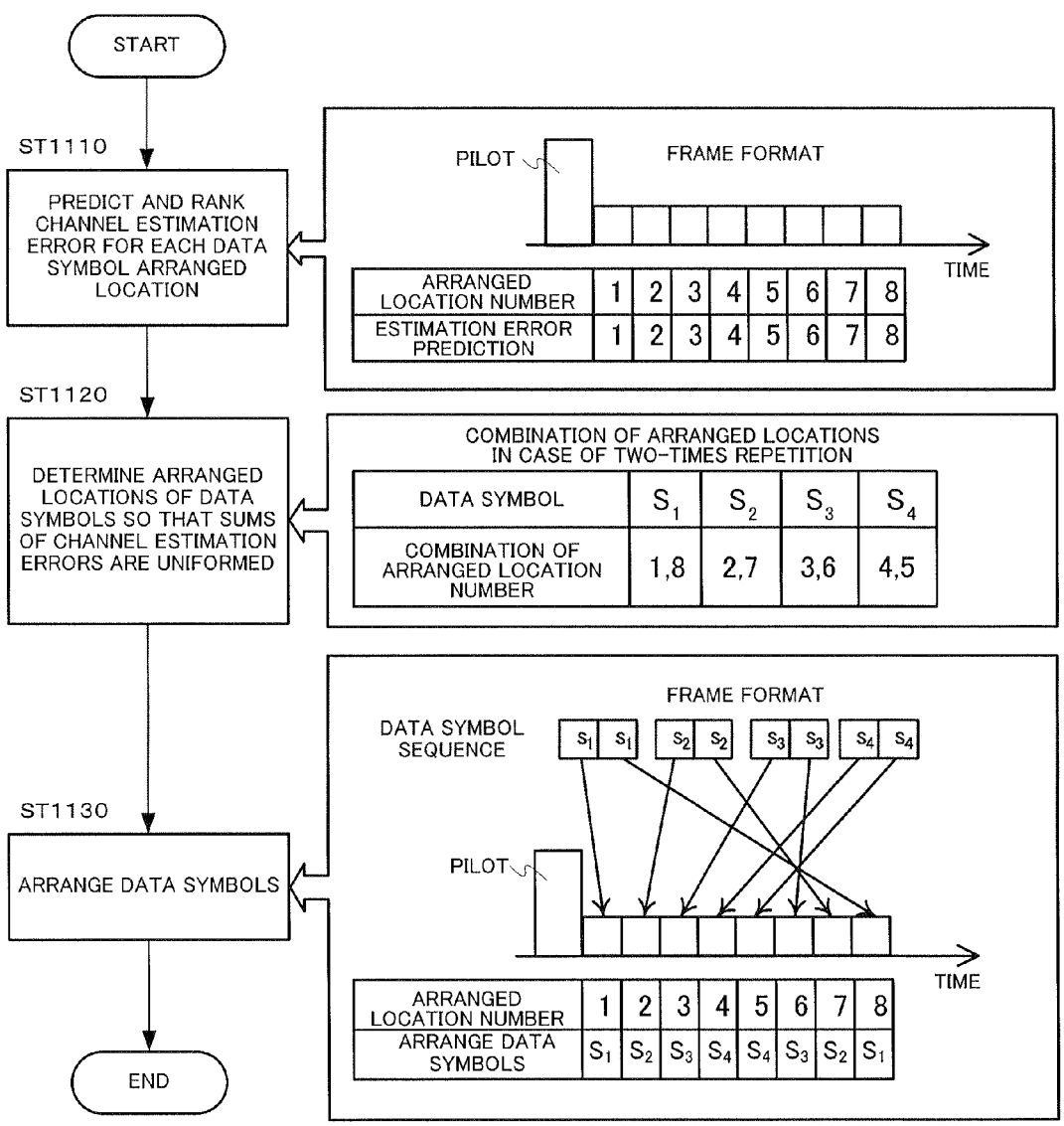
FIG. 13 illustrates the flow of a modification example of the radio communication method according to Embodiment 1 of the present invention.

FIG. 13 shows an aspect where data symbols $S_1$ to $S_4$ are arranged based on the rank with reference to the degree of channel estimation accuracy.

First, in step ST1110, channel estimation error predicting section 104 predicts the channel estimation errors in data symbol allocated locations in a single frame, and according to the predication result, data symbol mapping section 105 determines that the channel estimation accuracy is worse in ascending order of data symbol arranged location number, that is, from number 1 to number 8.

Next, in step ST1120, data symbol mapping section 105 determines that data symbols $S_1$ are mapped in arranged location number 1 with the best channel estimation accuracy and in arranged location number 8 with the worst channel estimation accuracy, so that overlapped channel estimation errors are uniformed when symbol combining is performed in radio communication apparatus 200. Similarly, in step ST1120, data symbol mapping section 105 determines that data symbols $S_2$ are mapped in arranged location numbers 2 and 7, data symbols $S_3$ are mapped in arranged location numbers 3 and 6, and that data symbols $S_4$ are mapped in arranged location numbers 4 and 5.

Subsequently, in step ST1130, according to the determination in step ST1120, data symbol mapping section 105 arranges four data symbols $S_1$ to $S_4$ inputted from repetition section 102 in the frame inputted from channel estimation error predicting section 104 in the order of $[S_1,S_2,S_3,S_4,S_4,S_3,S_2,S_1]$ in allocated location numbers 1 to 8.

Thus, when ranking is made using the degree of channel estimation accuracy as a reference for data symbol allocated locations based on the levels of the channel estimation errors, and the same data symbols are arranged sequentially from the maximum rank and minimum rank, it is possible to make amount of channel estimation errors overlapped through symbol combining almost uniform for data symbols $S_1$ to $S_4$.

Embodiment 2

Embodiment 1 has described the case where a pilot symbol and data symbols are multiplexed only in the time domain. Embodiment 2 will be described the case where pilot symbols and data symbols are multiplexed in the time domain and also in the frequency domain.

Figure 14:
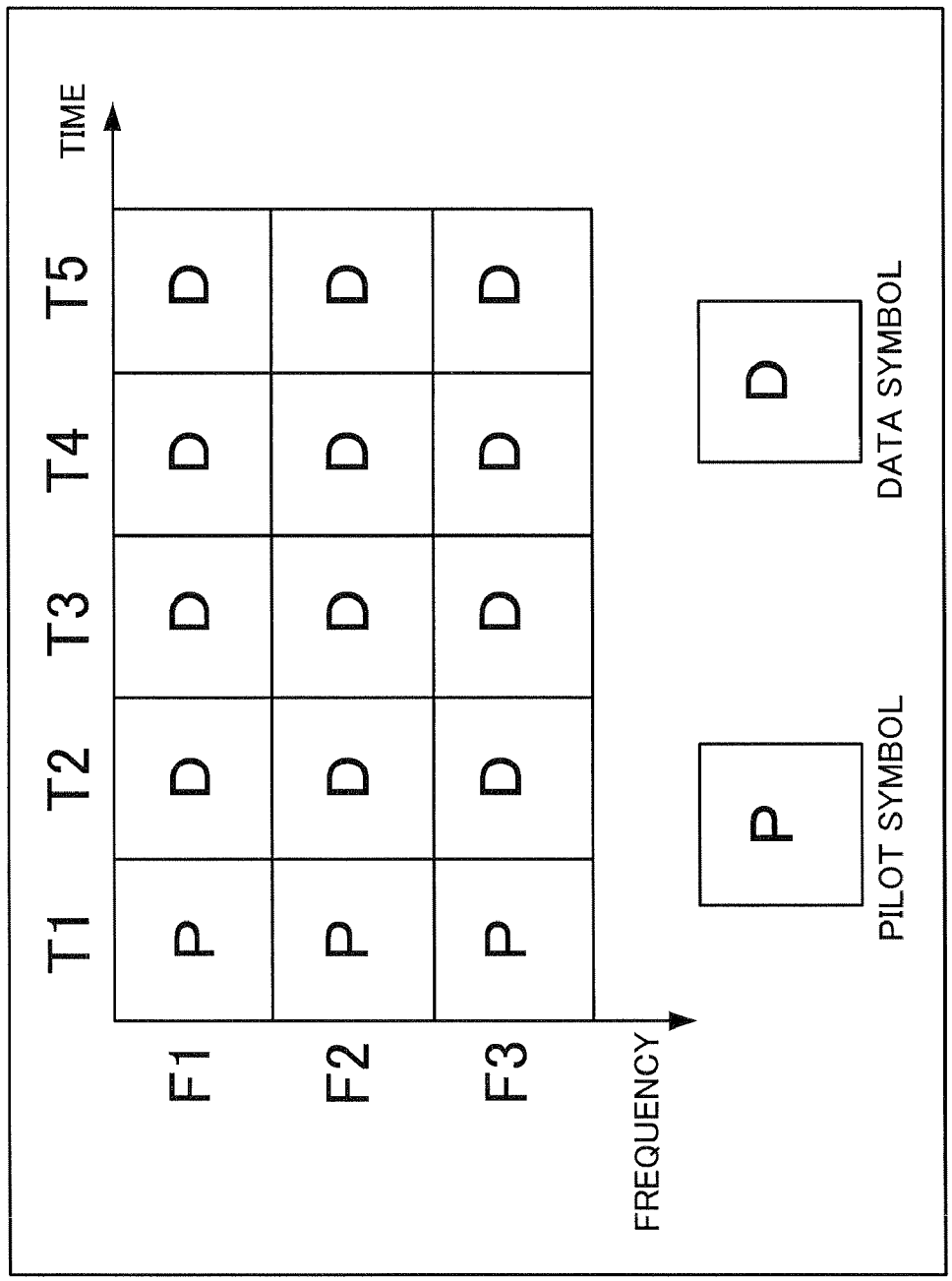
FIG. 14 illustrates a frame format of an OFDM signal in Embodiment 2 of the present invention.

FIG. 14 shows a frame format of an OFDM signal that is a transmission signal in this Embodiment. A frame of the OFDM signal in this Embodiment is comprised of fifteen arranged locations of symbols (pilot symbols and data symbols) consisting of five time numbers T1 to T5 and three frequency numbers F1 to F3. Further, it is assumed that pilot symbols are mapped all in three allocated locations with frequency numbers F1, F2 and F3 at time number T1 in the OFDM signal, and data symbols are mapped all in the other twelve allocated locations. Furthermore, it is assumed in this Embodiment that two-times repetition is performed as in Embodiment 1. Accordingly, in this Embodiment, each of six data symbols $S_1$ to $S_6$ is mapped twice in a single frame.

In this Embodiment, radio communication apparatus 100 arranges three pilot symbols and twelve data symbols in a frame of the OFDM signal as shown in FIG. 14. The operation of radio communication apparatus 100 in this Embodiment is almost the same as that in Embodiment 1, but in order to support characteristics of an OFDM signal, the operation of channel estimation error predicting section 104 and data symbol mapping section 105 partially differ from those in Embodiment 1. Therefore, in order to avoid redundancy, this Embodiment will describe only points different from Embodiment 1.

Figure 15:
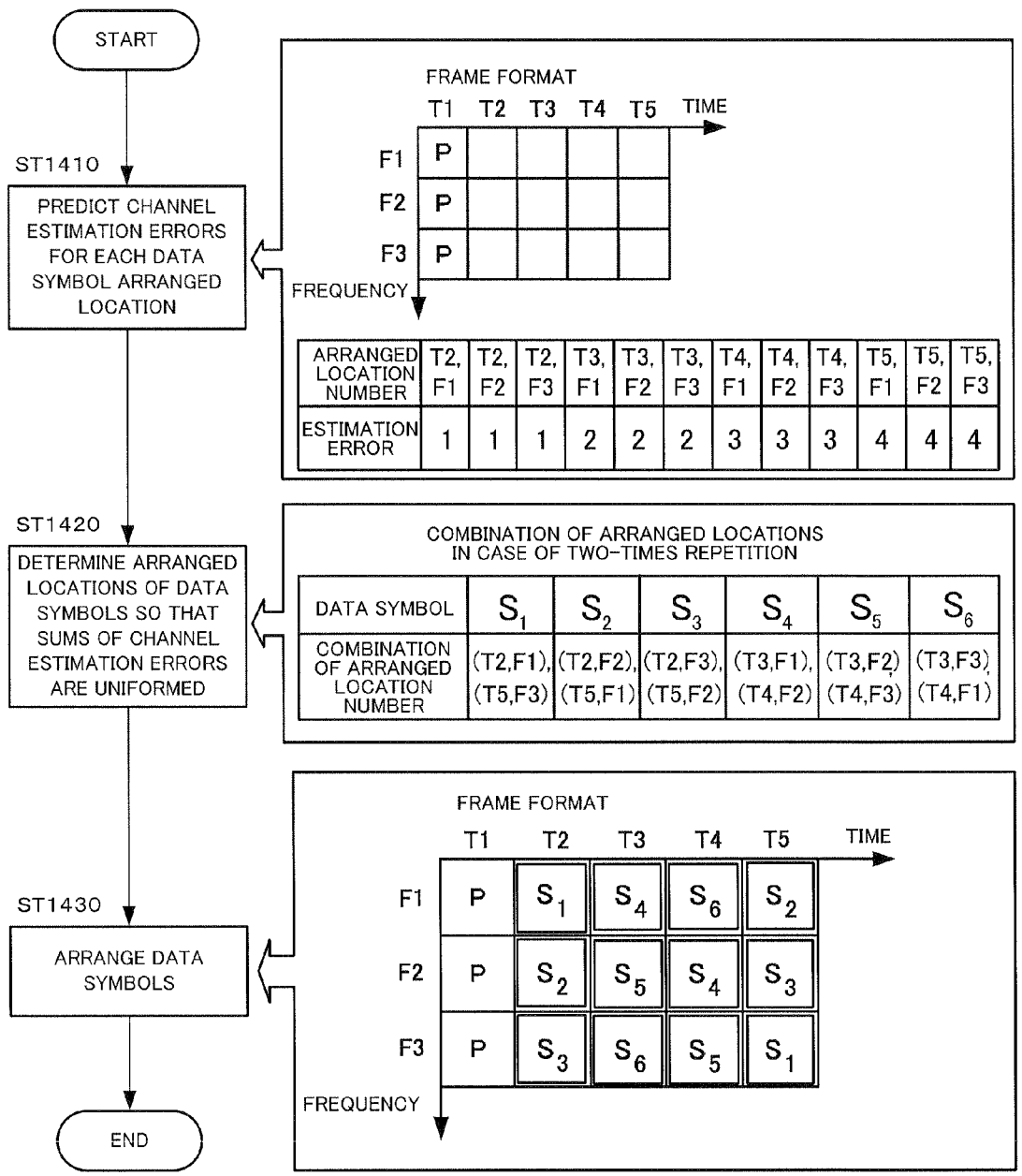
FIG. 15 illustrates the flow of a radio communication method according to Embodiment 2 of the present invention.

FIG. 15 schematically shows the operation of channel estimation error predicting section 104 and data symbol mapping section 105 in this Embodiment.

First, in step ST1410, for allocated locations of twelve data symbols in an OFDM signal, channel estimation error predicting section 104 calculates the distance in the time domain from the pilot symbol allocated in time number T1 with the same frequency number.

Herein, it is assumed in this Embodiment that as in Embodiment 1, channel estimation values in arranged locations of data symbols are calculated based on the amplitude and phase of a pilot symbol allocated at the head in the time domain with the same frequency number. Therefore, in this Embodiment, the levels of the channel estimation errors in arranged locations of the data symbols increase, as the distance in the time domain increases from the pilot symbol with the same frequency number.

More specifically, as shown inside the upper right box of FIG. 15, amount of channel estimation errors are all "1" and are minimum in three data symbol allocated locations with time number T2 and frequency numbers F1, F2 and F3, amount of channel estimation errors are then all "2" in three data symbol allocated locations with time number T3 and frequency numbers F1, F2 and F3, amount of channel estimation errors are then all "3" in three data symbol allocated locations with time number T4 and frequency numbers F1, F2 and F3, and amount of channel estimation errors are then all "4" and are maximum in three data symbol allocated locations with time number T5 and frequency numbers F1, F2 and F3.

Next, in step ST1420, so that overlapped channel estimation errors are uniformed when symbol combining is performed in radio communication apparatus 200, data symbol mapping section 105 determines that data symbols $S_1$ are mapped in data symbol arranged location number "T2,F1" with the best channel estimation accuracy and in data symbol arranged location number "T5,F3" with the worst channel estimation accuracy. Similarly, in step ST1420, data symbol mapping section 105 determines that data symbols $S_2$ are mapped in allocated location numbers "T2,F2" and "T5,F1", data symbols $S_3$ are mapped in allocated location numbers "T2,F3" and "T5,F2", data symbols $S_4$ are mapped in allocated location numbers "T3,F1" and "T4,F2", data symbols $S_5$ are mapped in allocated location numbers "T3,F2" and "T4,F3", and that data symbols $S_6$ are mapped in allocated location numbers "T3,F3" and "T4,F1".

Subsequently, in step ST1430, according to the determination in step ST1420, data symbol mapping section 105 maps six data symbols $S_1$ to $S_6$ inputted from repetition section 102 in the frame of the OFDM signal inputted from channel estimation error predicting section 104 in the order of $[S_1,S_4,S_6,S_2]$ for time numbers T2 to T5 in frequency number F1, in the order of $[S_2,S_5,S_4,S_3]$ for time numbers T2 to T5 in frequency number F2, and in the order of $[S_3,S_6,S_5,S_1]$ for time numbers T2 to T5 in frequency number F3.

In addition, in this Embodiment, radio transmission section 107 has a radio transmission processing unit for an OFDM signal including a parallel/serial transformer, IFFT processing section and guard interval inserting section, performs predetermined radio transmission processing on the OFDM signal inputted from control information mapping section 106, and thereby generates a transmission signal.

Thus, according to this Embodiment, even when a transmission signal is an OFDM signal, as in Embodiment 1, it is possible to reliably obtain diversity gain through symbol combining in all data symbols $S_1$ to $S_6$ arranged in the OFDM signal.

Figure 16:
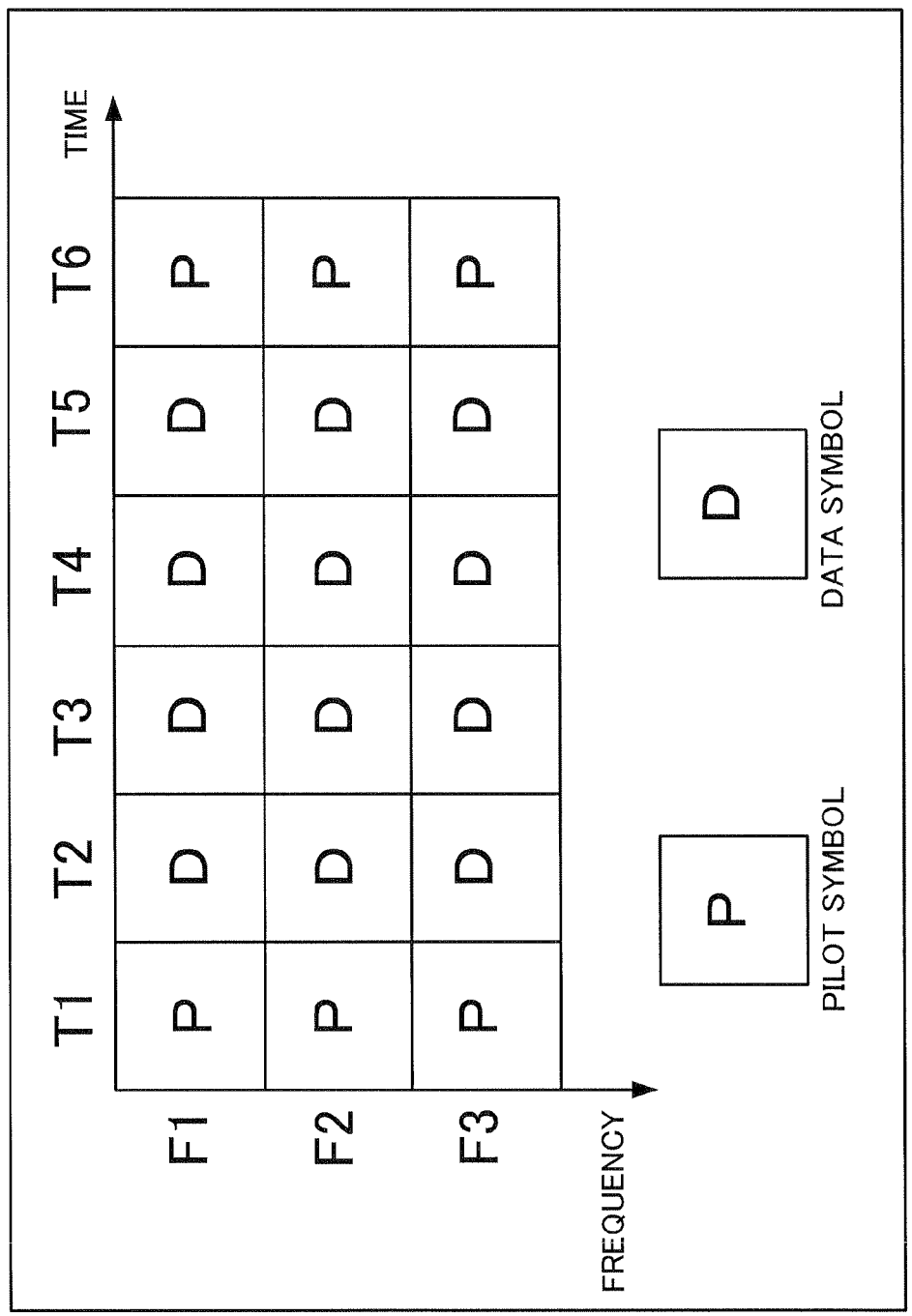
FIG. 16 illustrates a frame format of an OFDM signal in a modification example of Embodiment 2 of the present invention.

In addition, as shown in FIG. 14, this Embodiment has described the case where in the frame format of an OFDM signal, pilot symbols are arranged all in three arranged locations with frequency numbers F1, F2 and F3 and with time number T1, and that data symbols are arranged all in the other twelve arranged locations, but the present invention is not limited to this case. For example, in the frame format of an OFDM signal, as shown in FIG. 16, pilot symbols may be arranged all in six arranged locations with time numbers T1 and T6 and frequency numbers F1, F2 and F3, and data symbols are arranged all in the other twelve arranged locations. Such a frame format allows the first-order interpolation scheme and zero-order interpolation scheme explained in modifications of Embodiment 1 to be applied as a channel estimation scheme, and it is thereby possible to improve the channel estimation accuracy in data symbol allocated locations over the entire OFDM signal.

Embodiment 3

Figure 17:
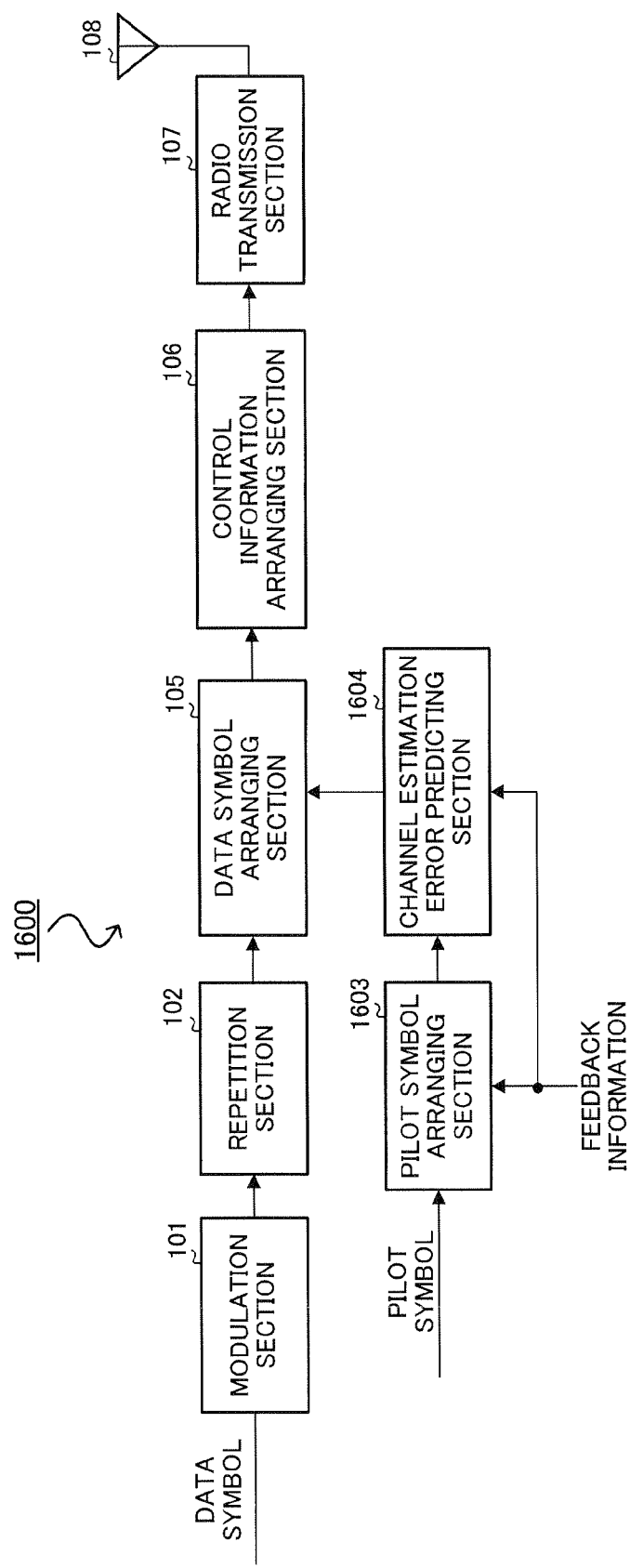
FIG. 17 is a block diagram showing a configuration of the main part of a transmitting-side radio communication apparatus according to Embodiment 3 of the present invention.
Figure 18:
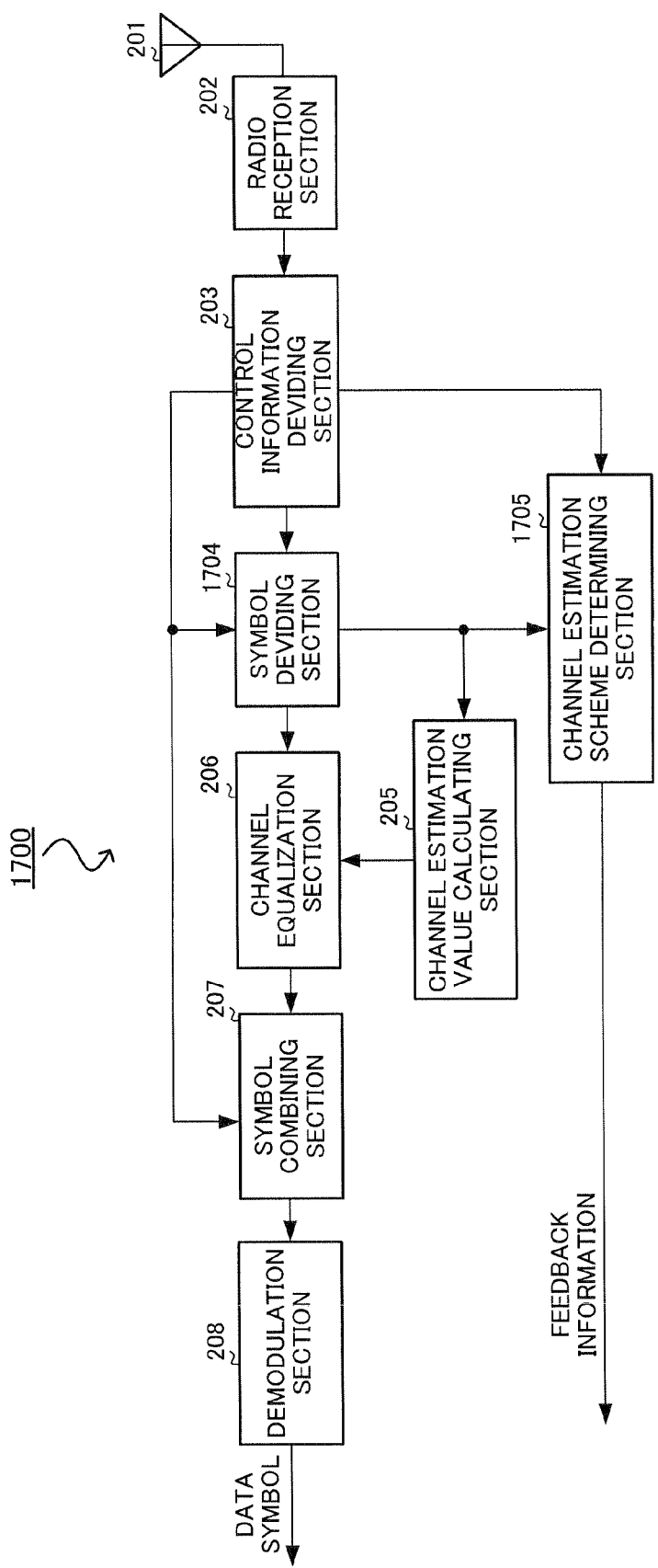
FIG. 18 is a block diagram showing a configuration of the main part of a receiving-side radio communication apparatus according to Embodiment 3 of the present invention.

FIG. 17 is a block diagram showing a configuration of the main part of radio communication apparatus 1600 according to Embodiment 3 of the present invention. FIG. 18 is a block diagram showing a configuration of the main part of radio communication apparatus 1700 that performs Repetition type radio communication with radio communication apparatus 1600.

Radio communication apparatus 1600 substitutes pilot symbol mapping section 1603 for pilot symbol mapping section 103, and channel estimation error predicting section 1604 for channel estimation error predicting section 104 in radio communication apparatus 100. Further, radio communication apparatus 1700 substitutes symbol dividing section 1704 for symbol dividing section 204, and newly has channel estimation scheme determining section 1705 in radio communication apparatus 200.

Accordingly, radio communication apparatus 1600 has many components having the same functions as components of radio communication apparatus 100, and radio communication apparatus 1700 has many components having the same functions as components of radio communication apparatus 200. Therefore, in this Embodiment, to avoid redundancy for radio communication apparatuses 1600 and 1700, descriptions are omitted for the components having the same functions as the components of radio communication apparatuses 100 and 200.

In addition, in this Embodiment, radio communication apparatus 1700 which receives a radio signal from radio communication apparatus 1600 measures a pilot symbol included in the received radio signal, and transmits information (feedback information) that is applied to a subsequent frame to improve diversity gain of data symbols to radio communication apparatus 1600. Accordingly, although not shown in FIGS. 17 and 18 explicitly, radio communication apparatus 1700 has a transmitting section to transmit a signal including the feedback information to radio communication apparatus 1600, and radio communication apparatus 1600 has a receiving section to receive the signal including the feedback information from radio communication apparatus 1700.

According to information indicating the number of pilot symbols to be arranged in a channel estimation interval included in the feedback information from radio communication apparatus 1700, pilot symbol mapping section 1603 determines arranged locations where a predetermined number of pilot symbols are mapped in a frame, and inputs the frame with pilot symbols arranged in the determined arranged locations to channel estimation error predicting section 1604.

Based on information indicating a channel estimation scheme, for example, information indicating whether the channel estimation scheme is the first-order interpolation scheme or zero-order interpolation scheme, included in the feedback information from radio communication apparatus 1700, channel estimation error predicting section 1604 predicts the channel estimation errors in the data symbol allocated locations (except pilot symbol arranged location) in the frame in which the pilot symbols inputted from pilot symbol mapping section 1603 are arranged.

For a single frame inputted from control information dividing section 203, based on control information separately inputted from control information dividing section 203, symbol dividing section 1704 specifies arranged locations of pilot symbols and data symbols to divide, and inputs divided pilot symbols to channel estimation value calculating section 205 and channel estimation scheme determining section 1705, and divided data symbols to channel equalization section 206.

Based on the control information inputted from control information dividing section 203, channel estimation scheme determining section 1705 specifies arranged locations of the pilot symbols in a frame, and measures the amplitudes and phases of the pilot symbols using the pilot symbols inputted from symbol dividing section 1704. Then, channel estimation scheme determining section 1705 observes the measured amplitudes and phases of the pilot symbols on the time series, monitors variations in the channel state, determines conditions for effectively achieving diversity gain through symbol combining in a subsequent frame, more specifically, the number of pilot symbols to be arranged in a single channel estimation interval and a channel estimation scheme for each data symbol arranged location, and transmits the determination results as the feedback information to radio communication apparatus 1600 via the transmitting section (not shown).

The operation of radio communication apparatuses 1600 and 1700 will be described below with reference to FIG. 19.

Figure 19:
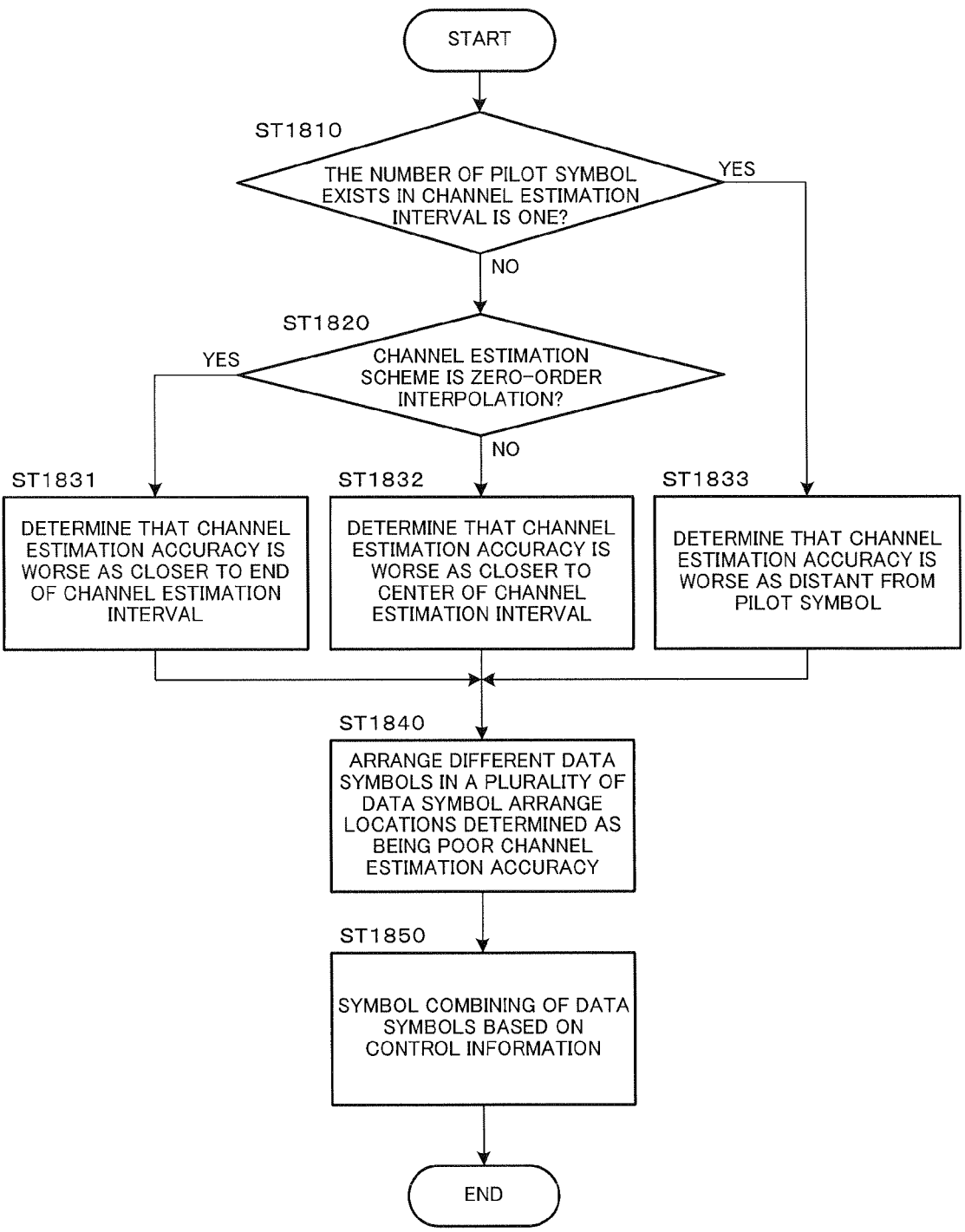
FIG. 19 shows the flow of a radio communication method in Embodiment 3 of the present invention.

FIG. 19 shows the flow of radio communication between radio communication apparatuses 1600 and 1700 in this Embodiment.

First, in step ST1810, pilot symbol mapping section 1603 determines whether the number of pilot symbols to be arranged in a single channel estimation interval is one, based on the feedback information from radio communication apparatus 1700. When the number of pilot symbols to be arranged in a single channel estimation interval is determined to be one in step ST1810, step S1833 is next executed. Meanwhile, when the number is determined not to be one, step ST1820 is next executed.

Then, in step ST1820, channel estimation error predicting section 1604 determines whether the channel estimation scheme is the zero-order interpolation scheme based on the feedback information from radio communication apparatus 1700. When the channel estimation scheme is determined to be the zero-order interpolation scheme in step ST1820, step ST1831 is next executed. Meanwhile, when the channel estimation scheme is determined not to be the zero-order interpolation scheme in step ST1820, step ST1832 is next executed.

Next, in step ST1831, a plurality of pilot symbols are mapped in a single channel estimation interval and the channel estimation scheme is zero-order interpolation, and therefore channel estimation error predicting section 1604 predicts that the channel estimation error increases in data symbol allocated locations in a frame as the arranged location approaches the end of the channel estimation interval. Then, in step ST1831, based on the predicted level of the channel estimation error, data symbol mapping section 105 specifies a data symbol arranged location with poor channel estimation accuracy.

Further, in step ST1832, a plurality of pilot symbols are mapped in a single channel estimation interval and the channel estimation scheme is not zero-order interpolation, that is, is first-order interpolation, and therefore channel estimation error predicting section 1604 predicts that the channel estimation error increases in data symbol allocated locations in a frame as the arranged location approaches the center of the channel estimation interval. Then, in step ST1832, based on the predicted level of the channel estimation error, data symbol mapping section 105 specifies a data symbol arranged location with poor channel estimation accuracy.

Further, in step ST1833, one pilot symbol is arranged in a single channel estimation interval, channel estimation error predicting section 1604 predicts that the channel estimation error increases in data symbol allocated locations in a frame as the distance from the pilot symbol increases. Then, in step ST1833, based on the predicted level of the channel estimation error, data symbol mapping section 105 specifies a data symbol arranged location with poor channel estimation accuracy.

Next, in step ST1840, data symbol mapping section 105 arranges different data symbols in data-symbol allocated locations with poor channel estimation accuracy determined in step ST1831, ST1832 or ST1833.

Subsequently, in step ST1850, based on the control information inputted from control information dividing section 203, symbol combining section 207 performs symbol combining on the same data symbols in a frame.

Thus, according to this Embodiment, channel estimation scheme determining section 1705 always monitors the actual channel state, and in order to adaptively support a variation in the state, the feedback information is transmitted to radio communication apparatus 1600, so that radio communication apparatus 1700 can suppress the number of pilot symbols in a frame to be within a required minimum number, prevent a decrease in transmission rate from radio communication apparatus 1600, and reliably obtain diversity gain through symbol combining of data symbols.

In addition, this Embodiment has described the case where radio communication apparatus 1700 (receiving side) has channel estimation scheme determining section 1705, but the present invention is not limited to this case. For example, radio communication apparatus 1700 may transmit the Doppler frequency $f_D$ or delay spread as the feedback information to radio communication apparatus 1600 (transmitting side), and radio communication apparatus 1600 (transmitting side) may determine conditions for effectively achieving diversity gain through symbol combining, more specifically, the number of pilot symbols to be arranged in a single channel estimation interval and the channel estimation scheme in each data symbol arranged location, arrange the pilot symbols and data symbols, and add control information indicating the determined channel estimation scheme to the frame at control information mapping section 106.

In addition, as described above, when radio communication apparatus 1600 (transmitting side) determines conditions for effectively achieving diversity gain through symbol combining, more specifically, the number of pilot symbols to be arranged in a single channel estimation interval and the channel estimation scheme in the data symbol arranged location, radio communication apparatus 1700 (receiving side) may compare (a) diversity gain through symbol combining and channel estimation accuracy obtained by using the channel estimation scheme determined in radio communication apparatus 1600 (transmitting side) with (b) diversity gain through symbol combining and channel estimation accuracy obtained by using another channel estimation scheme different from the channel estimation scheme determined in radio communication apparatus 1600 (transmitting side) and use the channel estimation scheme providing better reception characteristics between (a) and (b).

Embodiment 4

Embodiment 4 according to the present invention has described the case where radio communication apparatus 1600 described in Embodiment 3 arranges pilot symbols in a scattered manner, and radio communication apparatus 1700 reports the feedback information further including the Doppler frequency $f_D$ and delay spread measured by using the pilot symbols to radio communication apparatus 1600. This Embodiment will be described below, and descriptions are omitted on portions overlapping descriptions in Embodiments 1 to 3.

Figure 20:
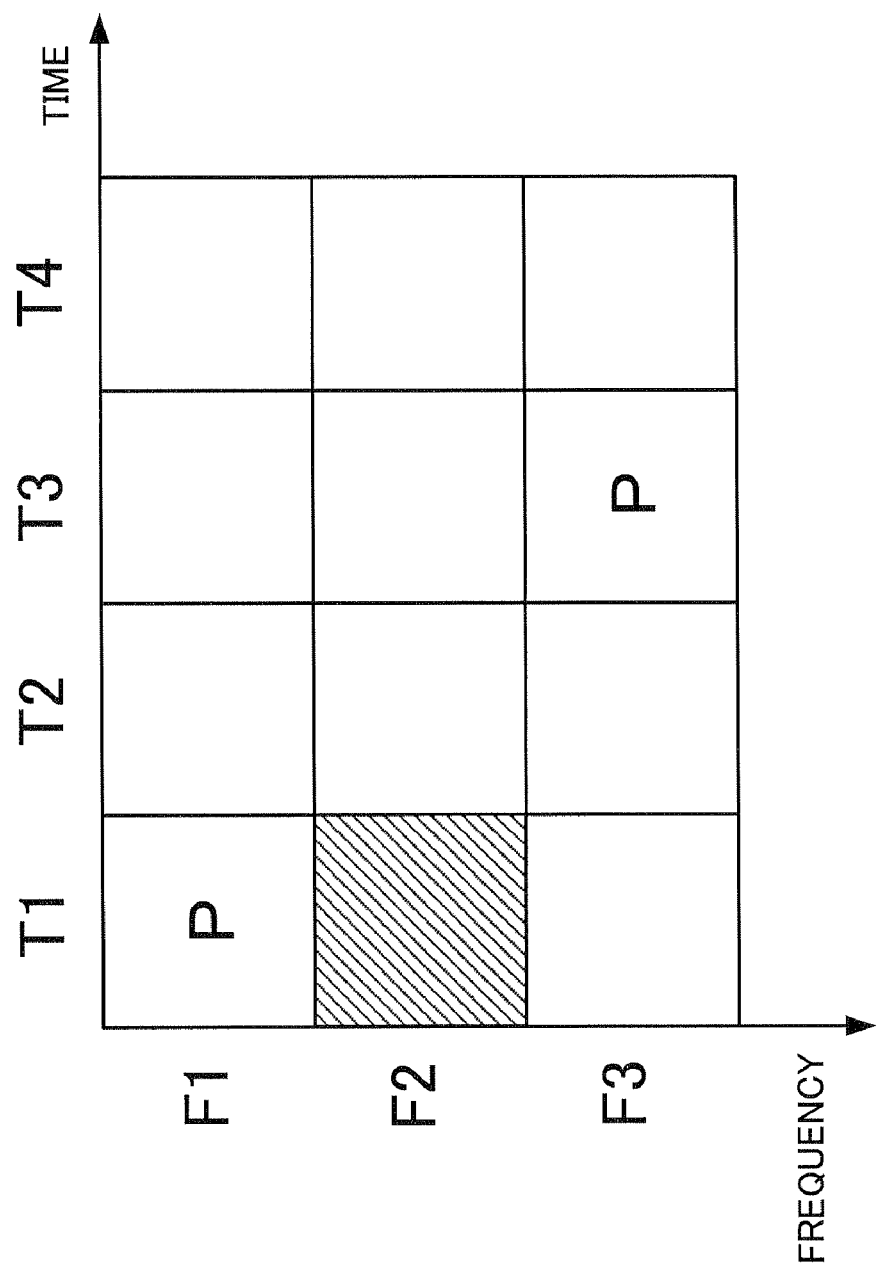
FIG. 20 shows a frame format of an OFDM signal in Embodiment 4 of the present invention.

FIG. 20 shows a frame format of an OFDM signal radio transmitted from radio communication apparatus 1600 to radio communication apparatus 1700 in this Embodiment. A frame of the OFDM signal in this Embodiment is comprised of total twelve arranged locations of pilot symbols and data symbols consisting of four time numbers T1 to T4, and three frequency numbers F1 to F3. Further, it is assumed in this Embodiment that two pilot symbols are scattered in a frame of the OFDM signal. Furthermore, in this Embodiment, two-times repetition is performed as in Embodiment 1, and therefore five types of data symbols $S_1$ to $S_5$ are arranged twice in a frame.

As shown in FIG. 20, when pilot symbol mapping section 1603 arranges two pilot symbols in pilot symbol/data symbol allocated location numbers "T1, F1" and "T3, F3", using a general equation [distance DX between each data symbol arranged location and a pilot symbol=the distance in the time domain×coefficient A+the distance in the frequency domain× coefficient B], for example, channel estimation error predicting section 1604 calculates distance D1 between arranged location number "T1,F2" and the pilot symbol arranged in arranged location number "T1,F1" as "D1=0×A+1×B". Similarly, distance D2 between arranged location number "T1,F2" and the pilot symbol arranged in "T3,F3" is calculated as "D2=2×A+1×B".

Herein, coefficient "A" is closely related to $f_D$, and coefficient "B" is closely related to delay spread. Accordingly, channel estimation error predicting section 1604 adjusts the coefficients "A" and "B" as appropriate based on $f_D$ and delay spread included in the feedback information from radio communication apparatus 1700, and then calculates distances D1 and D2. In addition, channel estimation error predicting section 1604 increases coefficient A as $f_D$ increases, and decreases coefficient A as $f_D$ decreases. Further, channel estimation error predicting section 1604 increases coefficient B as delay spread increases, and decreases coefficient B as delay spread decreases.

In this Embodiment, based on a shorter distance (hereinafter, referred to as the "shortest distance") between thus calculated distances D1 and D2, channel estimation error predicting section 1604 calculates the level of the channel estimation error in the data symbol arranged location. More specifically, channel estimation error predicting section 1604 predicts that the channel estimation error increases in a data symbol arranged location as the shortest distance of the arranged location increases. In other words, in this Embodiment, channel estimation error predicting section 1604 calculates the shortest distance, and then, as in the case where one pilot symbol is arranged in a frame as described in Embodiment 1, predicts the level of the channel estimation error.

Figure 21:
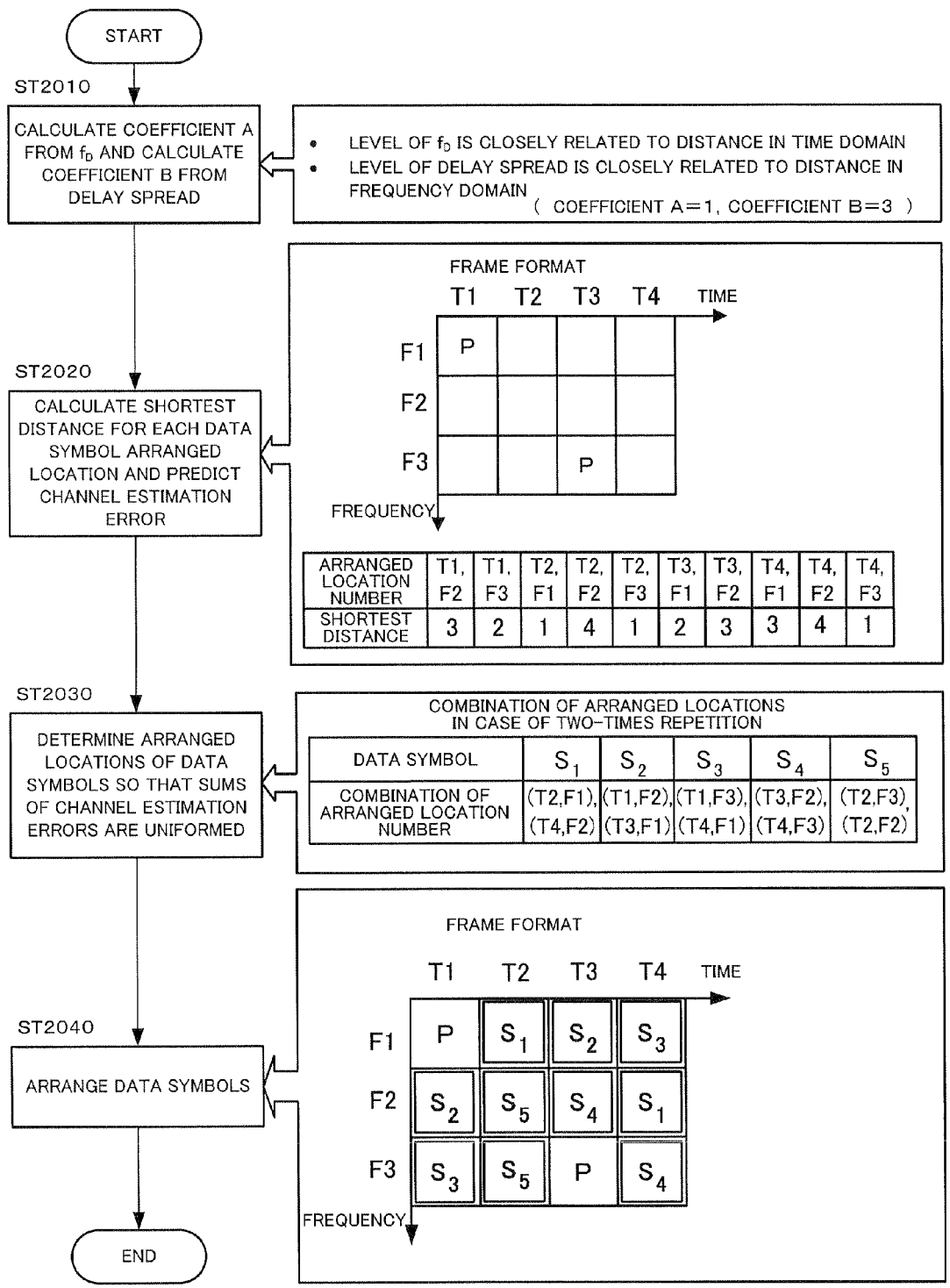
FIG. 21 shows the flow of a radio communication method according to Embodiment 4 of the present invention.

FIG. 21 schematically shows the operation of channel estimation error predicting section 1604 and data symbol mapping section 105 in this Embodiment.

First, in step ST2010, channel estimation error predicting section 1604 sets the coefficient "A" based on $f_D$ included in the feedback information from radio communication apparatus 1700 and further sets the coefficient "B" based on delay spread included therein. In this Embodiment, channel estimation error predicting section 1604 is assumed to set that "A=1" and "B=3".

Then, in step ST2020, channel estimation error predicting section 1604 receives the OFDM signal as shown in FIG. 20 from pilot symbol mapping section 1603, and calculates the shortest distance in each data symbol arranged location. More specifically, "A=1" and "B=3", channel estimation error predicting section 1604 calculates that the shortest distance of arranged location number "T1,F2" is "3", the shortest distance of arranged location number "T1,F3" is "2", the shortest distance of arranged location number "T2,F1" is "1", the shortest distance of arranged location number "T2,F2" is "4", the shortest distance of arranged location number "T2,F3" is "1", the shortest distance of arranged location number "T3,F1" is "2", the shortest distance of arranged location number "T3,F2" is "3", the shortest distance of arranged location number "T4,F1" is "3", the shortest distance of arranged location number "T4,F2" is "4", and that the shortest distance of arranged location number "T4,F3" is "1".

Subsequently, in step ST2030, so that overlapped channel estimation errors are uniformed when symbol combining is performed in radio communication apparatus 1700, data symbol mapping section 105 determines that data symbols $S_1$ are mapped in arranged location number "T2,F1" with the smallest shortest distance and in arranged location number "T4,F2" with the largest shortest distance. Similarly, in step ST2030, data symbol mapping section 105 determines that data symbols $S_2$ are mapped in allocated location numbers "T1,F2" and "T3,F1", data symbols $S_3$ are mapped in allocated location numbers "T1,F3" and "T4,F1", data symbols $S_4$ are mapped in allocated location numbers "T3,F2" and "T4,F3", and data symbols $S_5$ are mapped in allocated location numbers "T2,F3" and "T2,F2".

Next, in step ST2040, according to the determination in step ST2030, data symbol mapping section 105 arranges five types of data symbols $S_1$ to $S_5$ inputted from repetition section 102 in the frame of an OFDM signal inputted from channel estimation error predicting section 1604 in the order of [(pilot symbol),$S_1,S_2,S_3$] for time numbers T1 to T4 in frequency number F1, in the order of [$S_2,S_5,S_4,S_1$] for time numbers T1 to T4 in frequency number F2, and in the order of [$S_3,S_5$, (pilot symbol),$S_4$] for time numbers T1 to T4 in frequency number F3.

Thus, according to this Embodiment, pilot symbol mapping section 1603 arranges pilot symbols in a frame of an OFDM signal in a scattered manner, so that it is possible to maintain the channel estimation accuracy in all the data symbol allocated locations at a predetermined value or more and suppress the number of pilot symbols in a frame.

Further, according to this Embodiment, radio communication apparatus 1700 reports $f_D$ and delay spread as the feedback information to radio communication apparatus 1600, so that radio communication apparatus 1600 can predict and adaptively support the actual channel state upon transmitting a next transmission frame. As a result, according to this Embodiment, radio communication apparatus 1600 maps repeated data symbols so as to adapt to the predicted actual channel state, so that it is possible to increase diversity gain in radio communication apparatus 1700.

In addition, this Embodiment has described the case where data symbol mapping section 105 determines a data symbol arranged location with poor channel estimation accuracy based on the shortest distance from the pilot symbol, but the present invention is not limited to this case. For example, data symbol mapping section 105 may determine channel estimation accuracy in data symbol allocated locations based on the average value of distances from a plurality of pilot symbols.

Further, this specification has described the case where data symbol mapping section 105 arranges duplicated data symbols in the same frame, but the present invention is not limited to this case. For example, the present invention can be applied to data symbols before and after retransmission in H-ARQ (Hybrid-Automatic Repeat request). In other words, the present invention can be implemented by "mapping a symbol allocated in a portion with poor channel estimation accuracy in first transmission in a portion with good channel estimation accuracy in retransmission, for data symbols before and after retransmission."

Furthermore, this specification has described the case of performing symbol combining on data symbols repeated by repetition section 102, but the present invention is not limited to this case. For example, when modulation section 101 performs modulation by Modulation Diversity, the present invention can be similarly applied to Ich and Qch after Ich/Qch division of a data symbol in Modulation Diversity. In other words, the present invention can be implemented by "not mapping both of Ich and Qch after Ich/Qch division of a data symbol in Modulation Diversity in portions with poor channel estimation accuracy."

In addition, in the present invention, the transmission power may be weighted so that radio communication apparatus 100 or 1600 transmits a data symbol arranged in a portion with good channel estimation accuracy with large power, and transmits a data symbol in a portion with poor channel estimation accuracy with small power.

In addition, each function block employed in the description of each of the aforementioned embodiments may typically be implemented as an LSI constituted by an integrated circuit. These may be individual chips or partially or totally contained on a single chip.

"LSI" is adopted here but this may also be referred to as "IC", "system LSI", "super LSI", or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application in biotechnology is also possible.

The present application is based on Japanese Patent Application No. 2004-381888, filed on Dec. 28, 2004, the entire content of which is expressly incorporated by reference herein.

INDUSTRIAL APPLICABILITY

A radio communication apparatus and the like according to the present invention provide an advantage of reliably achieving diversity gain through symbol combining in all the data symbols included in a radio signal, and are useful in the next-generation mobile communication system and the like using the Repetition-OFDM scheme.

The invention claimed is:

1. A radio communication apparatus comprising:
   a repetition section that repeats a data symbol and generates a plurality of same data symbols;
   an error predicting section that predicts channel estimation errors in allocated locations of the generated same data symbols; and
   a data symbol mapping section that maps the same data symbols in the allocated locations where amount of the predicted channel estimation error is a predefined threshold or less.

2. The radio communication apparatus according to claim 1, wherein the data symbol mapping section maps different symbols of the same data symbols in a plurality of the allocated locations where the level of the predicted channel estimation error exceeds the threshold.

3. The radio communication apparatus according to claim 1, wherein:
   the error predicting section predicts the channel estimation errors based on an arrangement aspect of a pilot symbol allocated together with the same data symbols and a channel estimation scheme; and
   when the channel estimation scheme uses one pilot symbol, predicts that the channel estimation errors in the allocated locations increase as a distance between the allocated location and the one pilot symbol increases.

4. The radio communication apparatus according to claim 1, wherein:
   the error predicting section predicts the channel estimation errors based on an arrangement aspect of a pilot symbol allocated together with the same data symbols and a channel estimation scheme; and
   when the error predicting section performs channel estimation using a plurality of pilot symbols, data symbol mapping section maps the same data symbols in one of the allocated locations a predetermined number from an end of a channel estimation interval and in one of the allocated locations a predetermined number from a center of the channel estimation interval, respectively.

5. The radio communication apparatus according to claim 1, wherein, when the plurality of pilot symbols are mapped discretely both in the time domain and the frequency domain, the error predicting section predicts that the channel estimation errors increase, as a distance increases, the distance between the allocated location and a pilot symbol that is a shortest distance in the time domain and the frequency domain among the plurality of pilot symbols.

6. The radio communication apparatus according to claim 1, further comprising:
   a transmitting section that radio transmits an OFDM signal where a plurality of pilot symbols are mapped discretely in the time domain and the frequency domain, and the same data symbols are mapped by the data symbol mapping section; and
   a receiving section that receives feedback information including a Doppler frequency and delay spread measured by another radio communication apparatus that receives the OFDM signal,
   wherein the error predicting section calculates distances between the allocated locations and the plurality of pilot symbols by reflecting the Doppler frequency in the distances in the time domain between the allocated locations and the pilot symbols, and reflecting the delay spread in the distances in the frequency domain between the allocated locations and the pilot symbols, specifies a shortest distance among a plurality of distances calculated for each of the allocated locations, and predicts that the channel estimation errors increase in the allocated locations having the longer specified shortest distance.

7. A radio communication method comprising:
   a repetition step of repeating a data symbol and generating a plurality of same data symbols;
   an error predicting step of predicting channel estimation errors in allocated locations of the generated same data symbols; and
   a data symbol mapping step of mapping the same data symbols in the allocated locations where a level of the predicted channel estimation error is a predefined threshold or less.

* * * * *

UNITED STATES PATENT AND TRADEMARK OFFICE
CERTIFICATE OF CORRECTION

PATENT NO. : 7,729,443 B2
APPLICATION NO. : 11/722831
DATED : June 1, 2010
INVENTOR(S) : Masaru Fukuoka et al It is certified that error appears in the above-identified patent and that said Letters Patent is hereby corrected as shown below:

Title Page
The third Foreign Patent Document listed under Item (56), References Cited, in the Letters Patent which issued on June 1, 2010, incorrectly reads:

"JP 2004 10475    4/2004"

and should read:

--JP 2004 104775   4/2004--

Signed and Sealed this

Sixteenth Day of November, 2010

David J. Kappos
*Director of the United States Patent and Trademark Office*